Nov. 19, 1935.  H. A. BALLARD  2,021,218

MEASURING MACHINE

Filed Nov. 29, 1930  6 Sheets-Sheet 1

INVENTOR
Harrie A. Ballard
By his Attorney
Victor Colv.

Nov. 19, 1935.    H. A. BALLARD    2,021,218
MEASURING MACHINE
Filed Nov. 29, 1930    6 Sheets-Sheet 2
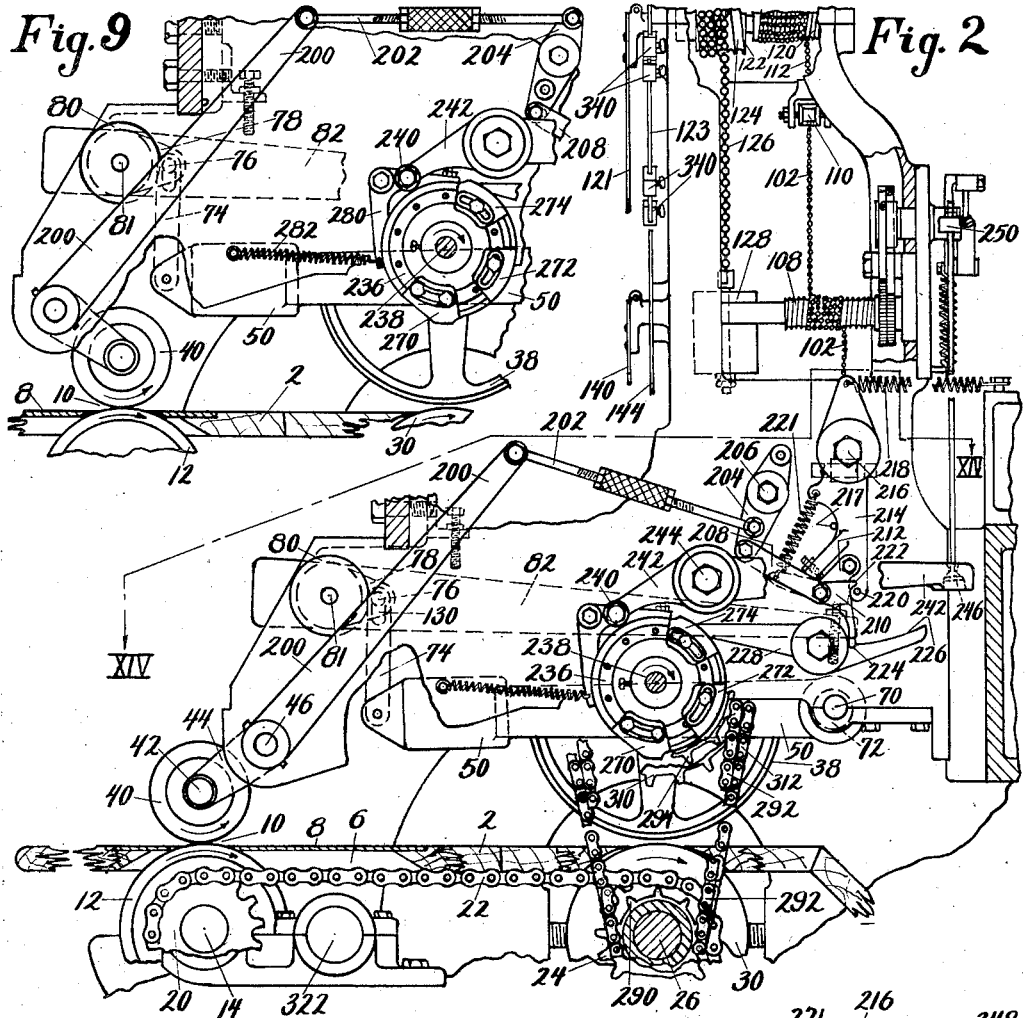
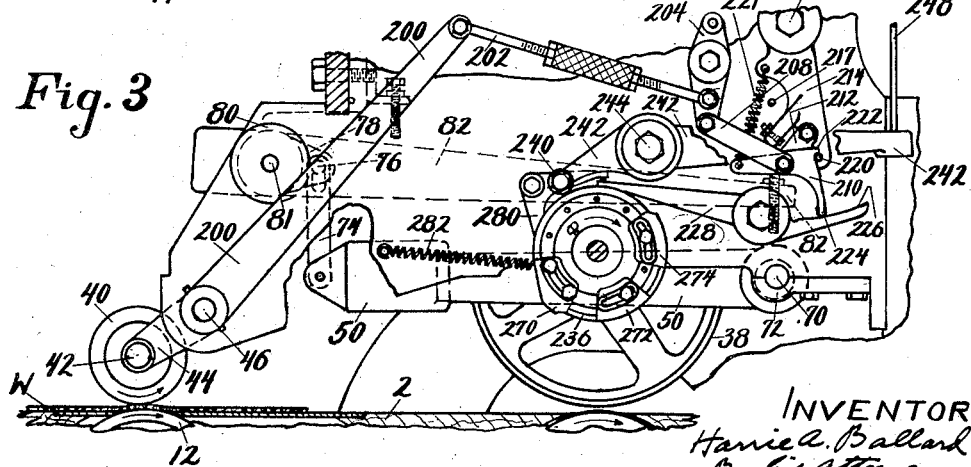

Nov. 19, 1935.    H. A. BALLARD    2,021,218

MEASURING MACHINE

Filed Nov. 29, 1930    6 Sheets-Sheet 3

INVENTOR
Harrie A. Ballard
By his attorney
Victor Coe

Nov. 19, 1935.                H. A. BALLARD                2,021,218
                           MEASURING MACHINE
                        Filed Nov. 29, 1930          6 Sheets-Sheet 4
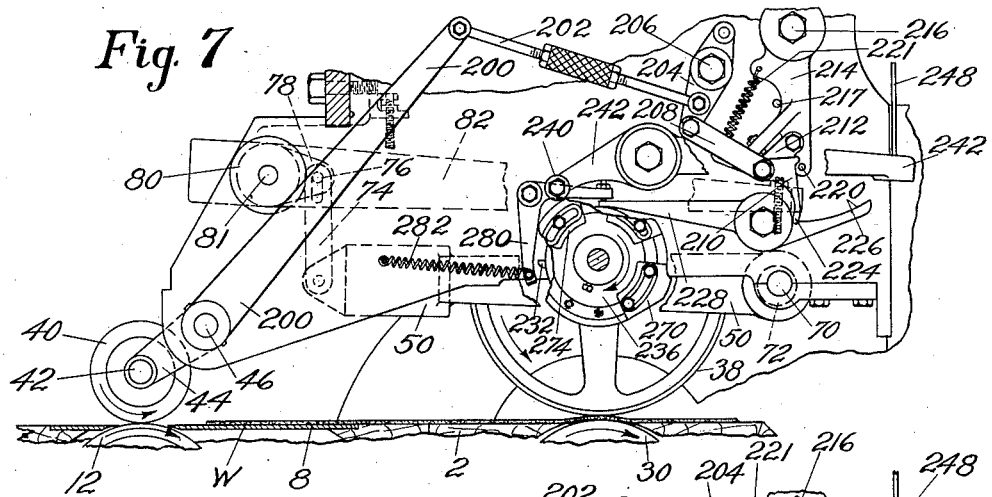
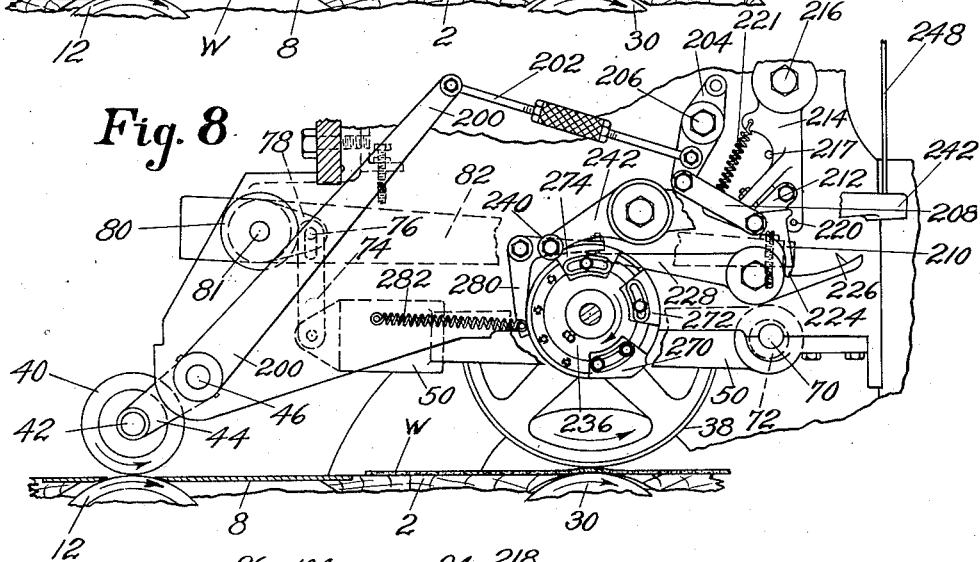
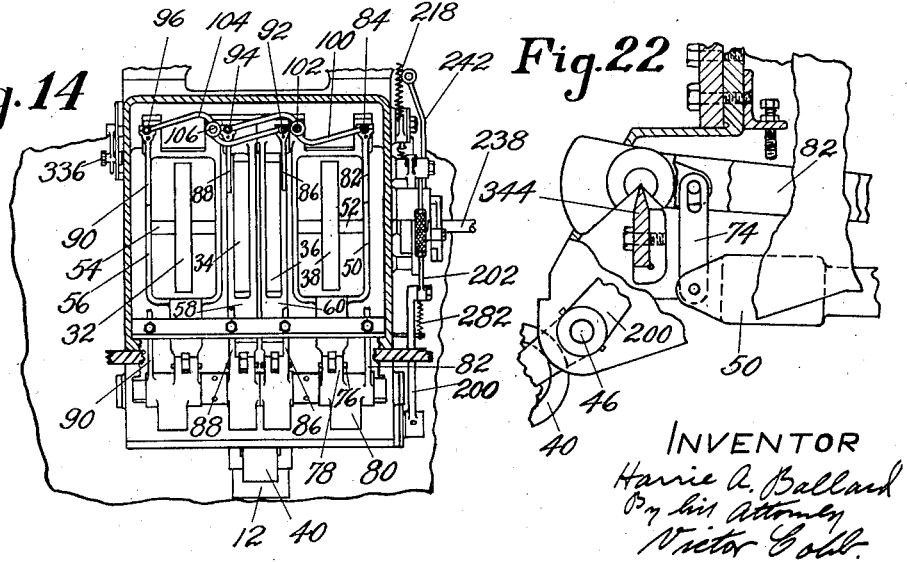

Nov. 19, 1935.   H. A. BALLARD   2,021,218
MEASURING MACHINE
Filed Nov. 29, 1930   6 Sheets-Sheet 5
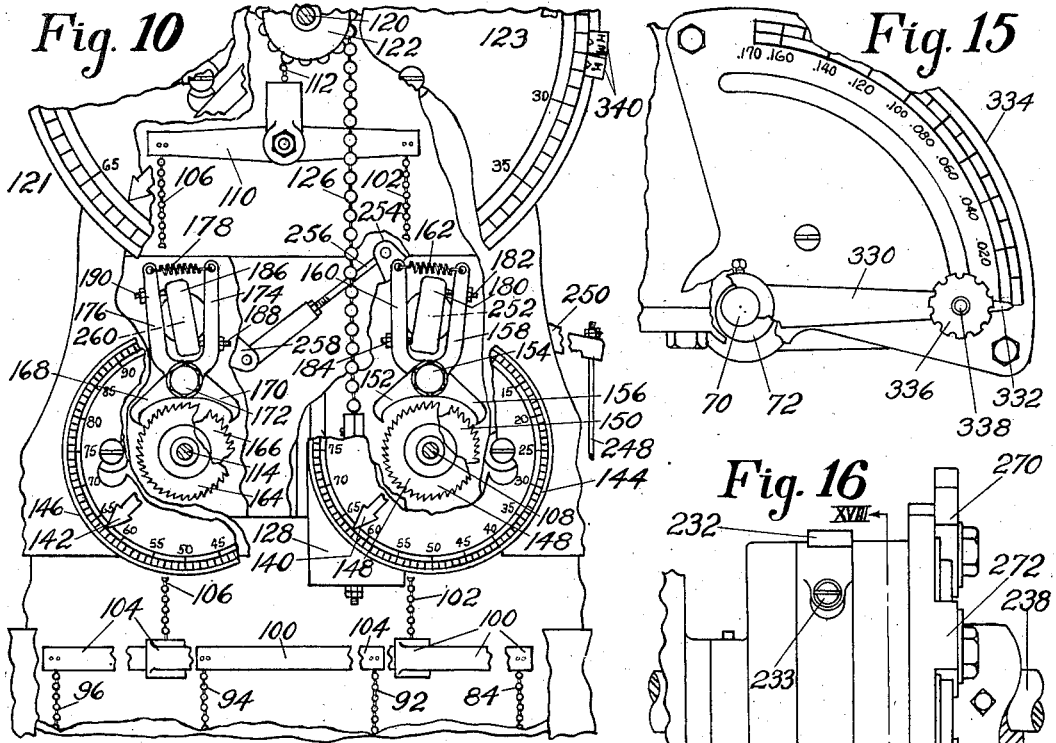
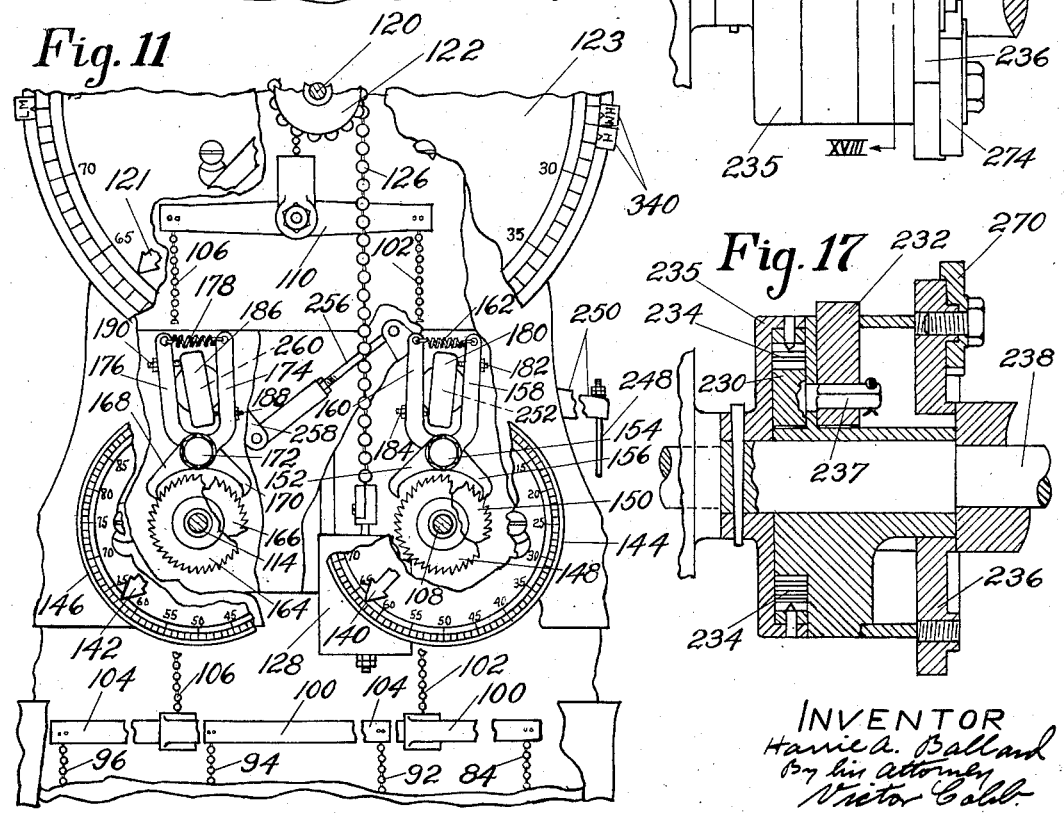

Nov. 19, 1935.  H. A. BALLARD  2,021,218
MEASURING MACHINE
Filed Nov. 29, 1930  6 Sheets-Sheet 6
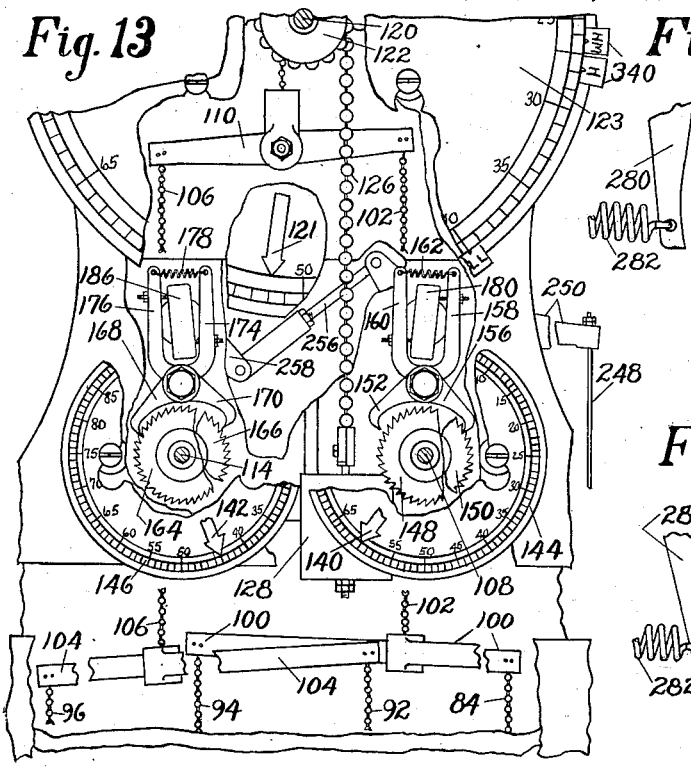
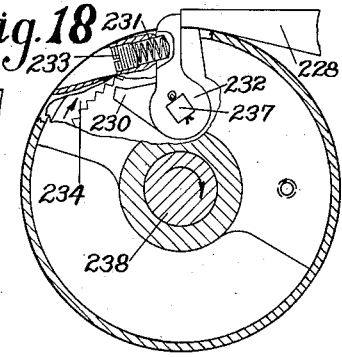
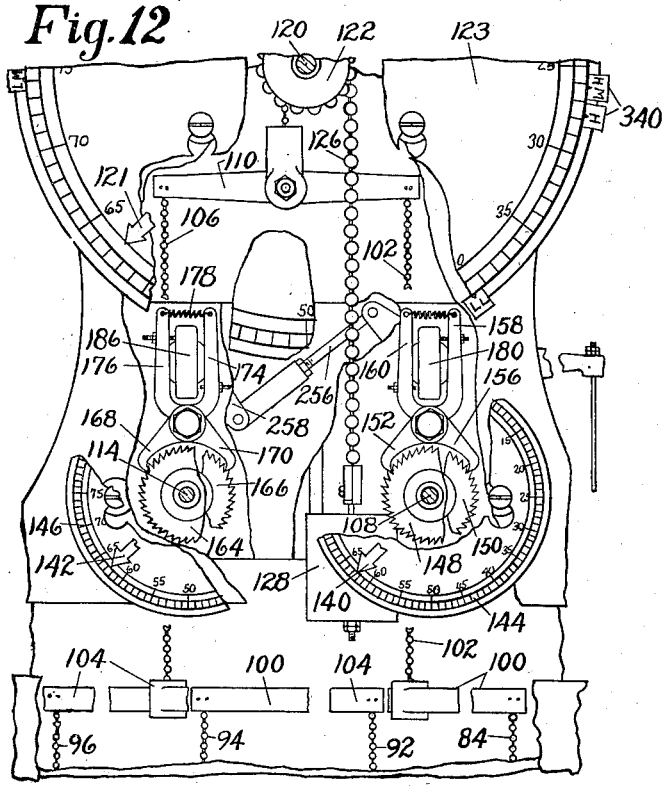
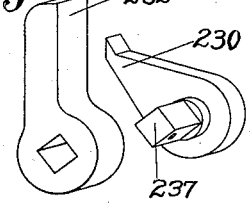
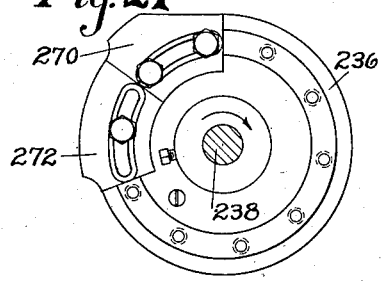
INVENTOR
Harrie A. Ballard
By his Attorney
Victor Cobb Patented Nov. 19, 1935

2,021,218

UNITED STATES PATENT OFFICE 2,021,218

MEASURING MACHINE

Harrie Albert Ballard, Beverly, Mass., assignor to The Turner Tanning Machinery Company, Portland, Maine, a corporation of Maine Application November 29, 1930, Serial No. 499,045

75 Claims. (Cl. 33—147)

This invention relates to machines for measuring dimensions of pieces of work and, more particularly, of pieces of work which vary substantially as to their dimensions in various portions thereof. The invention is illustrated as embodied in a machine for measuring thickness dimensions of hides, skins, leather and other similar pieces of work. It is to be understood, however, that the invention and various important features thereof may have other applications and uses.

It is an object of this invention to provide an improved machine for measuring characteristics of hides, skins, leather and other similar pieces of work throughout a wide range of such characteristics while maintaining a high standard of accuracy and efficiency in the machine operations. It is also an object of the invention to provide for measurements of the extreme opposite limits of a given characteristic of the work simultaneously and the indicating of such measurements without undue complexity in the measuring and indicating mechanisms. Further objects of the invention are to provide for machine measurement of pieces of work within certain predetermined portions of the pieces of work, which portions may be varied at the will of the operator to suit different classes of work, and to provide improvements applicable to measuring machines in general.

In accordance with methods long practised in the industry, hides and skins and other pieces of leather, when assorted by hand into various classes in accordance with their thickness dimensions, are tested for such thickness dimensions in certain well-defined portions of each hide or skin or other piece of leather. Kid and goat skins, for instance, when hand measured, are often folded along a line adjacent to or coincident with the backbone line and then measured by running the fingers opposed to the thumb along opposite sides of the folded piece of leather adjacent to the backbone line. Again, in measuring calf skins each individual piece is usually folded along a line extending substantially at a right angle to the backbone line back (toward the butt end) of the longitudinal center of the skin. The skin thus folded is then measured by running the fingers opposed to the thumb along opposite sides of the folded portion of the skin. In both of these cases it will be noticed that the thickness dimensions are determined by reference to those portions of each hide, skin, or other piece of leather which lie adjacent to the backbone line and at considerable distances from the marginal portions of each piece undergoing measurement. The reason for this resides in the fact that the flank and shank portions of hides and skins are thinner and of less desirable quality than portions lying closer to the backbone line.

For reasons given in the foregoing paragraph it is clear that hides, skins and other pieces of leather may advantageously be measured within certain restricted portions in order to obtain the best indications for assorting them into various classes with respect to any given characteristic thereof. It is a most important feature of the invention that means is provided in the illustrated machine for measuring and indicating the measurements in certain predetermined portions only of each hide or skin or other piece of leather being measured. Conveniently means is provided under the control of the operator for varying the portions within which measurements will be made to suit the requirements of various classes of work. There is a further decided advantage in measuring the work within a predetermined portion only since, by so doing, the operator is not distracted or confused by measurements taken in the less desirable portions of the work.

The described means for determining the portions within which thickness measuring operations shall be performed comprising, in the illustrated construction, means under control of a work contacting member for rendering the measurement indicating means inoperative until a predetermined portion of the front or entering end of the work has passed under work calipering elements in its movement into the machine, said means being also operative while under control by the same work contacting member, to render the indicating means inoperative for a predetermined distance from the rear or following end of the hide or skin as the latter is passing from front to rear of the machine during measuring operations. It is clear that with the operation of the means described, measurement begins some predetermined distance back from the front end of the skin or other piece of work and terminates some predetermined distance short of the rear end of the skin as the latter is passing through the machine.

In a preferred embodiment of the invention the means for predetermining the portion within measurements of the work are to be taken comprises a timing mechanism having connections with the indicating means operative to render the indicating means responsive and/or unresponsive to the work calipering means, in combination with a work contacting member arranged to ride upon the front or entering end of the work and to drop off of the rear or following end of the work and having connections for initiating operation of the timing mechanism and for terminating such operation. Through adjustment of a cam in the timing mechanism and/or of the work contacting member the unmeasured portion at the front or entering end of the work and the unmeasured portion at the rear or following end of the work may be varied within wide limits at the will of the operator.

In order to furnish additional guidance for the operator in assorting pieces of work in accordance with thickness dimensions thereof, means is provided in the illustrated machine for measuring and indicating the minimum and the maximum thickness dimensions in the portions measured during the measuring operation. In this way the operator is informed as to unduly thin or thick portions in a given piece of leather. This information may be such as to require reclassification of a given piece of work from that which it would ordinarily receive upon determination of its average thickness dimension according to methods commonly employed for the purpose. The indications of minimum and maximum thickness dimensions may also be utilized by the manufacturer in checking those manufacturing operations which precede the tanning operations, for instance, in the fleshing and splitting of hides and skins. Such indications as to the minimum and maximum thickness dimensions are also particularly advantageous in connection with the shaving of skins which takes place after the tanning operation and which should be performed with the greatest care and skill if uniformity in shaving results are to be obtained.

For indicating minimum thickness dimensions of pieces of work there is provided an indicator mechanism comprising a dial and a pointer wherein the pointer is permitted to indicate progressively thinner portions of the work as the latter passes along through the measuring elements, the pointer being locked against any movement in the opposite direction so that finally the minimum thickness dimension for the given piece of work is indicated by this dial and pointer. Preferably, also, another measurement indicating means is provided comprising a dial and a pointer which is movable over the dial to indicate progressively thicker portions of the work and is locked against movement in the reverse direction so that any thinner portion of the work in between thicker portions is not indicated on the dial. Conveniently, and as shown, a third measurement indicating means is provided comprising a dial and a pointer to which connections are provided from the two first-mentioned pointers to average the movements of these two pointers whereby the average dimension is made to depend upon the minimum and maximum thickness dimensions obtained by the measuring and measurement indicating means.

The provision of means for restricting thickness measurements to a predetermined portion in each hide or skin is particularly advantageous where means is provided for ascertaining the maximum and minimum thickness dimensions of the hide or skin for assorting purposes, since in assorting hides and skins in accordance with methods long practised in the industry, little or no attention is paid to thickness dimensions in the shanks and flanks of the hides or skins.

In the illustrated machine, improved connections are provided between work calipering members and the indicating means whereby movement of the calipering members, in one direction at least, permits movement of the indicating means through means constantly tending to effect such movement. Conveniently, the described connections comprise a lost motion connection whereby, upon movement of the calipering members in one direction, the indicating means through motive power independent of the calipering members, becomes operative to indicate measurements performed by the calipering members. Such an arrangement has the advantage of reducing to a minimum vibration and backlash in measuring machines of the type disclosed.

Because of the described lost-motion connections between the calipering and indicating means it is possible to provide for measurements upon the heaviest and the lightest grades of hides and skins without disturbing the connections between the indicating mechanism and the calipering members of the machine. In the illustrated construction, this most desirable result is accomplished through a manually operable member which may be adjusted to set the calipering members in accordance with the range of thickness dimensions of the lighter or heavier class of hides or skins to be measured. Conveniently, a dial or other indicating means is provided in connection with the manually operable member so that the operator may be guided in his adjustment of the latter member. Movement of the manually operable member results in spacing the calipering members a less or a greater distance from the work support over which the pieces of work pass in passing by the calipering members. In this way pieces of various ranges of thicknesses are readily accommodated and accurately measured.

These and other important features of the invention and novel combinations of parts will now be described in detail and then pointed out in the appended claims.

In the drawings,

Fig. 2 is a vertical sectional view taken along the line II—II of Fig. 1, looking in the direction of the arrows;

Fig. 3 is a view similar to Fig. 2 but restricted to cam mechanism and related parts for controlling the indicator mechanism shown in the upper part of Fig. 1;

Figure 1:
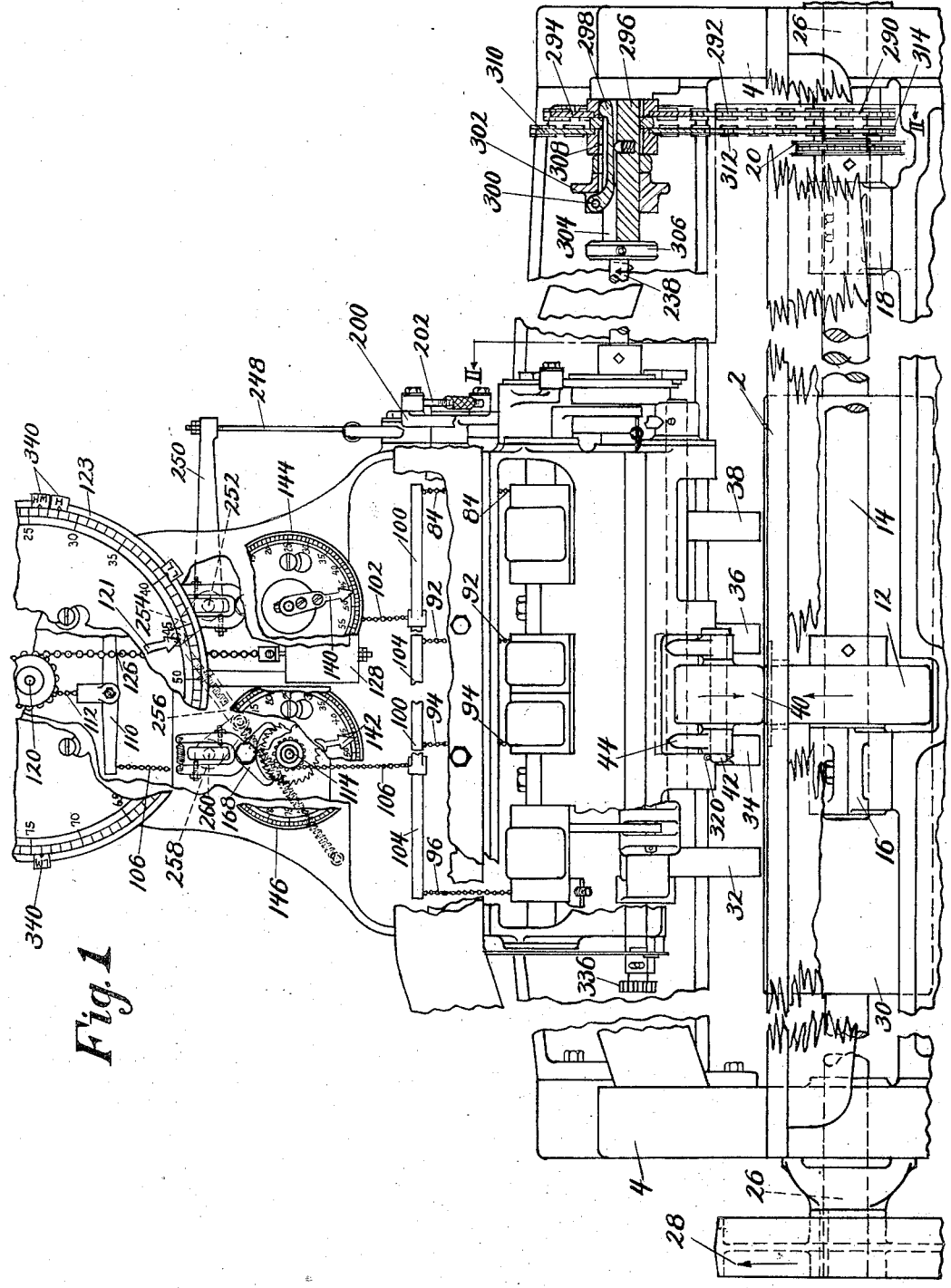
Fig. 1 is a front elevational view partly in section of a thickness measuring machine illustrating one embodiment of the invention.
Figure 4:
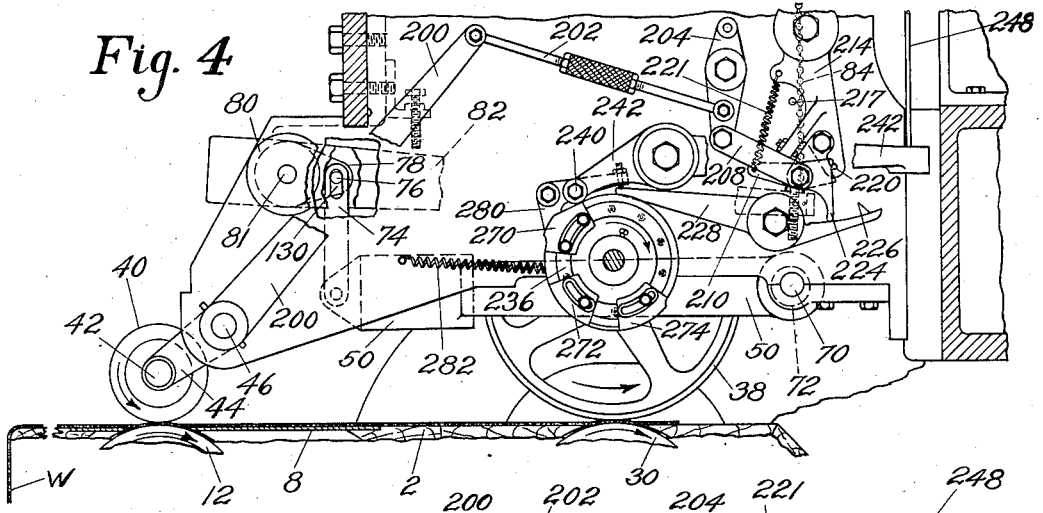
Figure 5:
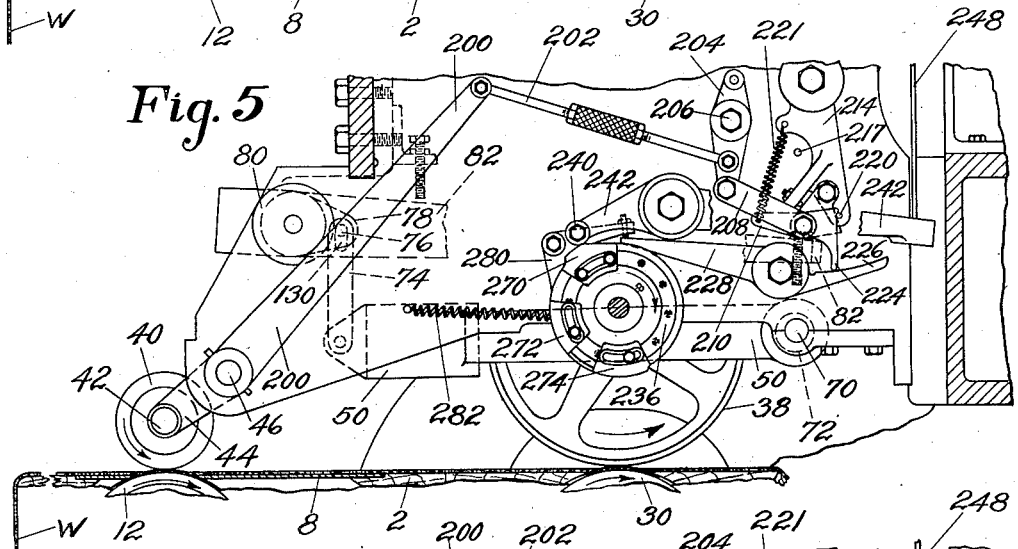

Figs. 4 to 8, inclusive, are views similar to Fig. 3 showing the parts at different points in the cycle of the machine operations;

Fig. 9 is a view similar to Fig. 3 but showing a modification obtained through adjustment of parts;

Figs. 10 to 13, inclusive, are front elevational views, partly in section, of the indicator mechanism shown at the upper part of Fig. 1;

Fig. 14 is a sectional view, on a smaller scale, taken along the line XIV—XIV of Fig. 2 and looking in the direction of the arrows;

Fig. 15 is a detail view of an adjusting mechanism for the calipering wheels;

Fig. 16 is a detail of a clutch mechanism;

Fig. 17 is a section of the clutch mechanism shown in Fig. 16;

Fig. 18 is a sectional view taken along the line XVIII—XVIII of Fig. 16;

Fig. 19 is a view similar to Fig. 18 with parts in different relations;

Fig. 20 is a detail of parts shown in Figs. 18 and 19;

Fig. 21 is a detail view of cam mechanism shown in Figs. 2 to 9, inclusive; and

Fig. 22 is a detail view showing a knife edge mounting for the wheel supporting levers shown in Figs. 2 to 9, inclusive.

In the illustrated machine, which is specially designed for measuring thickness dimensions of hides, skins, leather and other similar pieces of work, there is provided a work support or table 2 mounted upon the frame 4 of the machine. As shown, the table is made of boards although any other suitable material may be used. It has a cutaway portion at 6 (Fig. 2) in which is placed a sheet metal plate 8 having an opening at 10 through which projects a lower feed roll 12 which is fixedly secured to a shaft 14 mounted for rotation in bearings 16, 18 (Fig. 1) carried by the machine frame 4. At one end the shaft 14 is provided with a sprocket 20 over which passes a chain 22 for driving the shaft 14 and the lower feed roll 12 continuously at uniform speed while the machine is in operation. As shown most clearly in Fig. 2, the chain 22 passes over a sprocket 24 secured to a shaft 26 which is the main shaft of the machine, said shaft carrying at its opposite end a pulley 28 to which power may be applied from any suitable source. Fixed upon the shaft 26 is a bed roll 30 (Figs. 1 and 2) mounted so as to project through an opening in the table 2 with a portion of its periphery slightly above the plane of the work supporting surface of the table 2.

Mounted directly above the bed roll 30 is a plurality of calipering elements or thickness detecting members in the form of wheels 32, 34, 36, 38 (Figs. 1 and 14) which, during the operation of the machine, contact with the piece of work passing over the bed roll to measure the thickness of the work at a great number of points in lines extending from front to rear of the machine, the lines lying in paths traced by the calipering members or wheels during feeding of the work. Incidentally the wheels 32, 34, 36, 38 (Figs. 1 and 14) assist in feeding the work by pressing it upon the constantly rotating bed roll 30.

For co-operation with the lower feed roll 12, there is provided an upper feed roll 40 mounted upon a short shaft 42 carried by a yoke 44 fixedly secured to a shaft 46 pivotally mounted in the machine frame 4. It will be readily understood that a piece of work may be shoved over the upper surface of the forward portion of the table 2 until it is engaged by the feed rolls 12 and 40, whereupon the work is fed along over the table 2 until it engages the bed roll 30 which is constantly moving in the direction of the arrow in Fig. 2. Due to pressure of the calipering wheels 32, 34, 36, 38 the piece of work is pressed upon the rotating bed roll 30 and is carried along at the same rate as that imparted to the work by the feeding-in rolls 12, 40.

As indicated in the foregoing description, measurement of the thickness dimensions of pieces of work is accomplished in the illustrated machine by means of thickness detector members or calipering measuring wheels at 32, 34, 36 and 38 in co-operation with a bed roll 30. Obviously the greater the thickness dimensions of the work in the paths traced by the wheels during passage of the work through the machine the higher will the wheels be lifted upwardly away from the bed roll 30. Conversely, the thinner the work the less will each wheel be lifted from its initial position closely adjacent to the periphery of the bed roll 30. Preferably the calipering members or wheels 32, 34, 36 and 38 will be so adjusted as to be just out of contact with the bed roll 30, the arrangement being such that the thinnest pieces of leather will be properly fed through co-operation of the wheels and the bed roll 30 and accurately calipered as to thickness. For certain classes of work, as will be hereinafter described, the calipering wheels will be initially positioned at a substantial distance from the bed roll 30. It is to be understood, however, that in various figures of the drawings the wheels are located just out of contact with the bed roll 30 and in position to engage the thinnest pieces of leather.

Upon reference to Figs. 2 to 9, inclusive, and Fig. 14, it will be observed that the calipering wheel 38 is mounted in a yoke member 50 by means of a shaft 52 to which the wheel is adapted to be fixedly connected as by a set screw not shown, the arrangement being such that the wheel 38 may be adjusted lengthwise of the shaft 52 so as to bring it closer to or to move it further away from the wheel 32 which is similarly mounted for adjustment upon its shaft 54 in a yoke member 56. When measuring small skins such as kid, goat and sheep, it may be desirable to have the wheels 32 and 38 closer together even than shown in Fig. 14 of the drawings, so as to measure thickness dimensions along lines parallel to the backbone line of the skin and not spaced too far therefrom. At the same time the wheels 34 and 36 are calipering thickness dimensions along lines closely adjacent to the backbone line, it being understood that the skins will ordinarily be introduced into the machine with the backbone line parallel to and between the wheels 34 and 36. While the wheels 34 and 36 are not shown adjustable, it is clear that they may be mounted for adjustment in a manner similar to the wheels 32 and 38. The wheels 34 and 36 are each mounted in yoke members 58 and 60 which differ from the yoke members 50 and 56 in being narrower so that no adjustment in lateral directions is possible in the illustrated construction. Conveniently the yoke members 56, 58 and 60 are each mounted in a manner similar in all respects to the yoke member 50, the mounting of which will now be described in detail.

Upon reference to Figs. 2 to 8, inclusive, it will be observed that the yoke 50 is mounted upon a shaft 70 having an eccentric portion 72 which is common for all of the yoke members 50, 56, 58 and 60. It is to be understood that pivotal movement of the yoke members 50, 56, 58 and 60 will take place while the shaft 70 and its eccentric portion 72 is stationary. Such movement of the yoke members takes place when the calipering wheels supported thereby move up or down in accordance with variations in the thickness dimensions of the work. At its front end the yoke member 50 is connected by a link 74 to a pivot pin 76 (Figs. 2 to 9 and 14) carried by a bifurcated projection 78 integral with a sleeve 80 which also has integral therewith a lever arm 82 to the rear end of which is connected a chain 84 (Figs. 1 and 14). To the rear ends of levers 86, 88 and 90, (Fig. 14) corresponding to lever 82, are secured other chains 92, 94 and 96 respectively. At their ends chains 84 and 94 are connected to the free ends of a balanced lever 100 (Figs. 1 and 14) supported at its center of gravity by a chain 102. Similarly, chains 92 and 96 are connected at their upper ends to a balanced lever 104 supported at its center of gravity by a chain 106. As shown clearly in Fig. 2 of the drawings, the chain 102 is wound upon a spirally grooved shaft 108 from which the chain extends to a balanced lever 110 supported at its center of gravity by a chain 112 (Figs. 1 and 2). To the other end of the lever 110 is secured the chain 106 which, between its ends has been wound around a spirally grooved shaft 114 (Fig. 1 of the drawings) similar in all respects to the spirally grooved shaft 108 of Fig. 2. As shown in Figs. 1 and 2, the chain 112 is wound spirally upon a spirally grooved shaft 120 to which one end of the chain is fixedly attached. The shaft 120 carries a pointer 121 movable over an indicator dial 123 for indicating an average thickness of the piece of work being measured, as will hereinafter be described. As shown in Fig. 2, the shaft 120 has secured thereto a sleeve 122 having relatively large spiral grooves 124 for the reception of a chain 126 larger and stronger than the chains 102, 106, 112. This chain 126, which wraps on the shaft 120 on the side opposite from chain 112, is secured at one end to the sleeve 122 and after being wound spirally on the sleeve is extended downwardly for some suitable distance and is provided with a weight or weighted member 128, this weight or weighted member being sufficiently heavy to keep all of the chains taut and to counterbalance all of the levers 82, 86, 88 and 90 which levers are of the lightest construction, as will be evident upon inspection of Fig. 14.

The operation of the parts connected and controlled by the various chains mentioned will be clear upon consideration of the lever 50 and its associated parts in Fig. 2. As heretofore stated, the calipering wheel 38 is mounted upon the yoke lever 50 which is pivotally supported upon the eccentric portion 72 of the shaft 70. When the wheel 38 is moved upwardly by reason of a piece of work passing between the wheel and the bed roll 30, the forward end of the yoke lever 50 is raised, thus lifting the link 74 pivoted to its forward end. Since the link 74 has a slot at 130 for the reception of the pivot pin 76 upward movement of the link 74 will not exert any upward pressure on the pivot pin 76 but the lever 82 which is rigid with the projection 78 carrying the pivot pin 76 is free to move upwardly, which it promptly does under the pull of the chain 84. Similarly, when the other wheels 32, 34 and 36 are lifted various distances by the work the corresponding yoke or yoke members 56, 58, and 60 are lifted, thus permitting the corresponding levers 90, 88, and 86 respectively to move upwardly under the influence of chains 96, 94 and 92 respectively, all the chains being kept taut through the operation of the weighted member 128. It will be clear from the description that the chains and the parts carried or controlled thereby have a lost-motion connection with the wheels and their associated supporting levers all of which are normally stationary in their lowest positions. On the other hand, the wheels and their supporting levers are so mounted that, upon upward movement, they release the chains or connected parts for operation by the weighted member 128. It will be understood, however, that upon downward movement of the wheels 32, 34, 36, 38 the described chains and connected parts will be operated in the reverse direction by the links 74 which pull downwardly on the levers 82, 86, 88 and 90. Hence, as the calipering wheels travel along over pieces of work which vary more or less constantly in thickness along the paths traced by the wheels upon the work, the chains 102 and 106 will cause rotation in reverse directions of the shafts 108, 114, and also through chain 112 of the shaft 120, if provision be not made to prevent such constant reversing or oscillatory movement of these shafts.

Upon inspection of Figs. 1 and 10 to 13, inclusive, it will be observed that the shafts 108, 114 have associated therewith pointers 140 and 142 respectively which move over the faces of indicator disks 144, 146, respectively. If, then, the shafts and pointers were allowed to oscillate, as above described, it would be extremely difficult to read the results of the thickness measuring operations upon the indicators. For this reason means is provided for restricting the movements of the pointers so that measurements performed upon the work through the operation of the calipering wheels may be readily read from the indicators. It is preferred, moreover, to construct and arrange one indicator to indicate measurements of the progressively thickest portions along the paths of the associated calipering wheels. In other words, this indicator will record finally the maximum thickness of the work found along these paths while, as shown, the other indicator will record the minimum thickness of the work found along the paths of the other set of calipering wheels.

In the illustrated construction the lower indicator at the right in Figs. 1 and 10 to 15, inclusive, indicates the maximum thickness while the lower indicator at the left registers the minimum thickness of the work along the paths of the respective sets of calipering wheels. It is to be noted in this connection that the four calipering wheels in the illustrated construction are arranged in pairs, the wheels 34 and 38 being connected indirectly as described by chains 94 and 84 respectively to lever 100 from which there extends the chain 102 to the shaft 108 of the right-hand lower indicator of the machine. So, also wheels 32 and 36 are connected indirectly by chains 96 and 92, respectively, to the lever 104 which in turn is connected by chain 106 to the shaft 114 of the left-hand lower indicator. It follows that the maximum thickness readings are taken from measurements performed by a calipering wheel (34) which operates closely adjacent to the backbone line of the skin and by another calipering wheel (38) which operates along a path at a greater distance from the backbone line and on the opposite side of said line. This is true also of the measurements registered by the minimum thickness indicator at the left of the operator while facing the machine.

In order that the maximum thickness indicator may operate to register only the successively increasing thickness dimensions along the paths of the calipering wheels 34 and 38, means is provided for permitting the pointer 140 to move in one direction only, that is, in the direction to indicate increases in the thickness dimension of the work while, at the same time, it is held against such movement as would indicate a dimension less than that previously registered in the measurement of a given piece of work. As shown, the shaft 108 has fixed thereto two disks 148 and 150 having peripherally arranged teeth which face in opposite directions on the two disks. For co-operation with the disk 148 there is provided a pawl 152 pivoted upon the machine frame by a pivot member 154. For co-operation with the toothed disk 150 there is provided a pawl 156 also pivoted upon the pivot member 154, the pawls 152, 156 having upwardly extending arms 158 and 160, the arms being connected by a spring 162 which tends constantly to move the spaced arms 158, 160 toward each other into a position where their corresponding pawls 152, 156 are engaged with the teeth of the respective disks 148 and 150. Similarly, the shaft 114 has fixed thereto disks 164 and 166 having peripherally arranged teeth which point in opposite directions on the two disks. For co-operation with the teeth of the disk 164 there is provided a pawl 168 and a corresponding pawl 170 for co-operation with the teeth of the disk 166. These pawls are pivoted upon a pivot member 172 and have arms 174, 176 respectively extending upwardly in spaced relation with respect to each other and connected by a spring 178. This spring 178 constantly tends to move the pawls 168 and 170 to positions into engagement with respect to their associated disks 164 and 166 respectively.

For controlling the pawls 152, 156 there is provided a cam 180 adapted to contact with set screws 182, 184 in the pawl arms 158 and 160, respectively, as shown in Fig. 10, wherein both of the pawls 152, 156 are held out of engagement with their respective disks 148 and 150. Upon rotation of the cam 180 to a substantially vertical position, as shown in Fig. 12, the pawls 152, 156 are in engagement with the teeth on their respective disks 148 and 150. In an intermediate position, shown in Fig. 11, pawl 156 is in engagement with one of the teeth on the disk 150 while the other pawl 152 is held out of engagement with its respective disk 148. Similarly a cam 186 is provided for controlling the pawls 168 and 170 through contact with set screws 188, 190 in pawl arms 174 and 176 respectively. In the position shown in Fig. 10, the cam 186 holds the pawls 168 and 170 both out of contact with their respective toothed disk 164 and 166. Again, in Fig. 12, the cam 186 is so positioned as to permit both pawls 168 and 170 to be in engagement with their respective toothed disks locking both of the disks against movement so that the shaft 114 cannot move in either direction. In an intermediate position the cam 186, as shown in Fig. 11, permits engagement of the pawl 168 with the toothed disk 164 to prevent movement of the shaft 114 in one direction. It may move in the opposite direction since the pawl 170 is held out of engagement with the toothed disk 166.

To summarize, the cams 180, 186, in the positions they occupy in Fig. 10 of the drawings, operate to hold their associated pawls both out of contact with respect to their corresponding disks and hence the shafts 108 and 114 are free to rotate in either direction. Hence, the pointers 140 and 142 may oscillate with respect to the indicator disks 144 and 146. This freedom of the shafts 108, 114 and pointers 140, 142 is provided for during certain intervals when it is not desired to register movements of the calipering wheels, even though a piece of work is passing through between the calipering wheels and the bed roll of the machine.

In the positions of the cam members 180, 186 shown in Fig. 11 of the drawings, the pawl 156 of the right-hand indicator is in a position to engage with teeth upon the disk 150, the arrangement being such that the disk 150 may move only in one direction, that is, in response to an upward movement of one or both of the calipering wheels 34, 38 when a thicker portion of the work passes under either or both of said wheels.

When a thinner portion passes under the wheels 34, 38, the shaft 108 and consequently its pointer 140 are prevented from reverse movement so that it is only when a portion thicker than that previously measured comes along that the pointer 140 is free to move and indicate the measurement of such thicker portion. In this way the pointer 140 is caused to register the measurement of the thickest portion of the work in the paths of the two calipering wheels 34, 38 and hence this lower indicator at the right is spoken of as the maximum thickness indicator. This does not mean that the thickest point in the paths of the calipering wheels 34 and 38 is indicated for the reason that there is an averaging between the movements of the wheels 34 and 38 at all times and this averaging is reflected in the movements of the pointer 140. It does mean that the two wheels 34 and 38 together operate to give a very fair estimate of the maximum thickness of different portions of a piece of leather during travel of the calipering wheels from front to rear over certain portions of the skin or other piece of leather being measured.

With respect to the cam 186 both pawls 168 and 170 are held out of contact with respect to the disks 164 and 166 in Fig. 10 so that the shaft 114 and the pointer 142 are free to oscillate during a time when it is not desired to register movements of the calipering wheels 32 and 36. In Fig. 11, however, the cam 186 has moved to a position wherein the pawl 168 is in position to engage with teeth of the disk 164 while at the same time the pawl 170 is held out of contact with respect to the disk 166. In this case the shaft 114 and its associated pointer 142 may move in one direction only, namely, in a direction to indicate progressively decreasing thicknesses of the work. The shaft and pointer cannot move in the opposite direction to indicate an increase in thickness of the work because the pawl 168 prevents such movement.

When the shaft 114 is prevented from rotating in a direction to register a greater thickness than the minimum so far registered through the operation of the pawl 168, it means that the pawl 168 in co-operation with the disk 164 is resisting movement which would normally take place due to the effect of the weight or weighted member 128. When the pawl 156 prevents rotation of the disk 150 in a direction to indicate a lesser thickness than that so far registered through the co-operation of the pawl 156 and the disk 150 the weight of the calipering wheels 34 and 38 and of their associated parts must be borne by the links and chains which form the connections between the wheels 34 and 38 and the pointer shaft 108. Hence, in neither case is there any injury to the mechanism as a result of the failure of the shafts 108 and 114 to follow the up and down movements of their respective sets of calipering wheels.

Preferably and as shown, the pointer shafts 108 and 114 will be locked in their respective indicating positions at some predetermined time, for instance, at a definite distance from the end of the piece of leather being measured. Hence, the cams 180 and 186 are caused at the proper time to move to substantially vertical positions, as shown in Fig. 12, in which case both the maximum thickness pointer and the minimum thickness pointer are locked in indicating positions. The reason for this provision for locking the indicator pointers resides in the fact that hides, skins, and pieces of leather made from hides and skins all vary considerably in their thickness dimensions throughout substantial areas of each piece of work. Hence, it has been found advantageous in measuring a piece of leather for its thickness dimensions in the operation of assorting the work into various piles in accordance with the thickness dimensions thereof to take the measure of each piece of work in a selected area and not over the whole piece of work. It is a fact that the best portions of a hide or skin lie away from the marginal portions of the hide or skin and upon each side of the backbone line of the hide or skin beginning a variable but substantial distance from the head end of the hide or skin and ending at a variable but substantial distance from the butt end of the same hide or skin. In other words, the marginal portions of the hide or skin and, particularly, the flank and shank portions are, in general, much thinner than the back portions of the same hide or skin. On the other hand, the head and neck portions are sometimes thicker than the body portions lying along each side of the backbone line but are not of as good a grade of leather. Hence, in assorting hides, skins, or pieces of leather for thickness, measurement should be made in that part of the hide, skin or piece of leather which contains leather of the most desirable quality and substance. Therefore, the illustrated machine is so constructed and arranged as to take measurements within a predetermined area of the hide, skin or piece of leather.

Conveniently, the upper feeding-in roll 40 is utilized as a controller member, in conjunction with a controller cam hereinafter described, for determining operations of the indicator mechanism described in the foregoing paragraph. As already stated, the roller 40 (Fig. 2) is mounted in a yoke 44 pivoted upon the pivot shaft 46. Secured to the yoke 44 is a lever arm 200 also turning about the axis of the pivot shaft 46. Pivotally connected to the upper end of the lever arm 200 is a link 202, the other end of which is pivotally connected to a lever 204 pivoted at 206 in the frame of the machine, the link 202 being preferably extensible through a turn buckle located between its ends. Pivotally connected to the lower end of the lever 204 is a second link 208 pivoted at its outer end to a trip lever 210 which is pivotally supported by a link 212 pivoted upon a carrier 214 mounted for swinging movement about a pivot 216 supported in the machine frame. In Fig. 2 of the drawings the carrier 214 is held against a stud 217 by a spring 218. At its lower end the carrier 214 carries a pin 220 which is adapted to be engaged by a shoulder 222 on the trip lever 210, a spring 221 tending to hold the shoulder 222 against the pin 220 at all times. The arrangement is such that the trip lever 210 turns about the pin 220 as a pivot as it is shoved downwardly and to the right by the link 208. As shown, the trip lever 210 has a projecting arm 224 which is arranged to move along a cam surface 226 on one arm of a clutch control lever 228, the far end of which is operative under certain conditions to hold a clutch pawl 230, 232 (Figs. 18, 19 and 20) in inoperative position against the pressure of a spring 231 backed by an adjustable plug 233. The relative positions of the parts shown in Fig. 18 correspond to the showing of parts in Fig. 2 while Fig. 19 corresponds to the position of the parts in Fig. 3 where the trip lever 210, 224 through its operation of the cam surface 226 of the clutch controlling lever 228 has lifted the operative end of the lever away from the clutch pawl 230, 232 so that the clutch pawl member 230 becomes engaged with a tooth on a toothed clutch member 234 rigid with a casing 235 which is pinned to a shaft 238, as indicated in Figs. 17 and 19. It will be understood that the clutch pawl 230, 232 when released by the clutch lever 228 is moved to operative or clutching position by the spring 231 (Figs. 18 and 19). In this connection it is pointed out that pawl members 230 and 232 move together at all times, being joined together by a pin 237, having a square sectioned part for holding the pawl member 232 against rotation with respect to the pawl member 230 (Fig. 20).

When clutching takes place, as just described, a cam wheel 236 (Figs. 2 to 8, inclusive) which is normally loose on the shaft 238 is clutched thereto. Shaft 238 is constantly driven by means which will be described later in this specification. Contacting with the periphery of the cam member 236 is a cam roll 240 carried by a lever 242 pivoted at 244 upon the machine frame and having at its other end a socket 246 (Fig. 2) for reception of a ball-ended portion of a rod 248, the upper end of which passes slidably through a perforation in a lever 250, nuts being provided on the end of the rod 248 for holding it connected to the lever 250.

This lever 250 is shown in Figs. 1, 2, and 10 to 13, inclusive. It is shown in Figs. 1 and 10 secured upon a pivot shaft 252 journaled in the frame of the machine. Extending beyond the pivot point is an arm of the lever 250 designated by reference character 254 to the end of which is pivotally connected a link 256, the link being extensible in a well-known manner and pivoted at its other end to a lever 258 which, as shown in Figs. 1 and 10, is secured upon a pivot shaft 260 journaled in the frame of the machine. As shown in Figs. 1, 2, and 10 to 13, inclusive, the pivot shafts 252 and 260 carry the cams 180 and 186, respectively, already described.

After each piece of work has passed through the illustrated measuring machine the indicator pointers 140, 142 will be found locked as shown in Fig. 12. Hence, when a new piece of work W is introduced under the feeding-in roll 40, the clutch controlling lever 228 (Figs. 2 and 3) is operated in the manner just described to initiate throwing in of the clutch whereby the cam wheel 236 is rotated so that finally a high part or cam 270 of the cam wheel 236 operates to lift the cam roll 240 thereby operating the lever 242 and, through the described connections, rotating the cams 180 and 186 (Figs. 10 to 13, inclusive) from their positions of vertical alinement (Fig. 12) to the tipped positions shown in Fig. 10 whereby the pointer shafts 108, 114 are released, thus conditioning the indicator mechanism for indicating operations with the piece of work then in the machine.

Beyond the high part 270 of the cam wheel 236 is a middle cam portion made up of peripheral parts of the cam wheel 236 and adjustable cam blocks 272 and 274. When the roll 240 drops down from the high part 270 of the cam wheel 236 on to the middle cam portion, formed by the periphery of the cam wheel 236 and the blocks 272 and 274, the levers 250 and 258 (Figs. 1 and 10 to 13, inclusive) are moved from the position shown in Fig. 10 to that shown in Figs. 11 and 13 wherein the right-hand pawl 156 of the right-hand indicator and the left-hand pawl 168 of the left-hand indicator are caused to engage teeth 75 of their corresponding disks 150 and 164, respectively, to lock the corresponding pointer shafts 108 and 114 against rotation in one direction only. In other words, the shaft 108 is still free to rotate in a clockwise direction in response to the presence of progressively thicker portions of work while the pointer shaft 114 is still free to rotate in a counterclockwise direction in response to the presentation of progressively thinner portions in the work passing under the corresponding calipering wheels.

In passing from the positions shown in Fig. 10 to those shown in Fig. 11 the cams 180 and 186 move just far enough to release the pawls 156 and 168 to the action of the corresponding spring 162 or 178 without releasing the other pawl of each set. The second pawls 152 and 170 are released only when the cams 180 and 186 assume the vertical position shown in Fig. 12, which takes place as will be hereinafter described.

Figure 6:
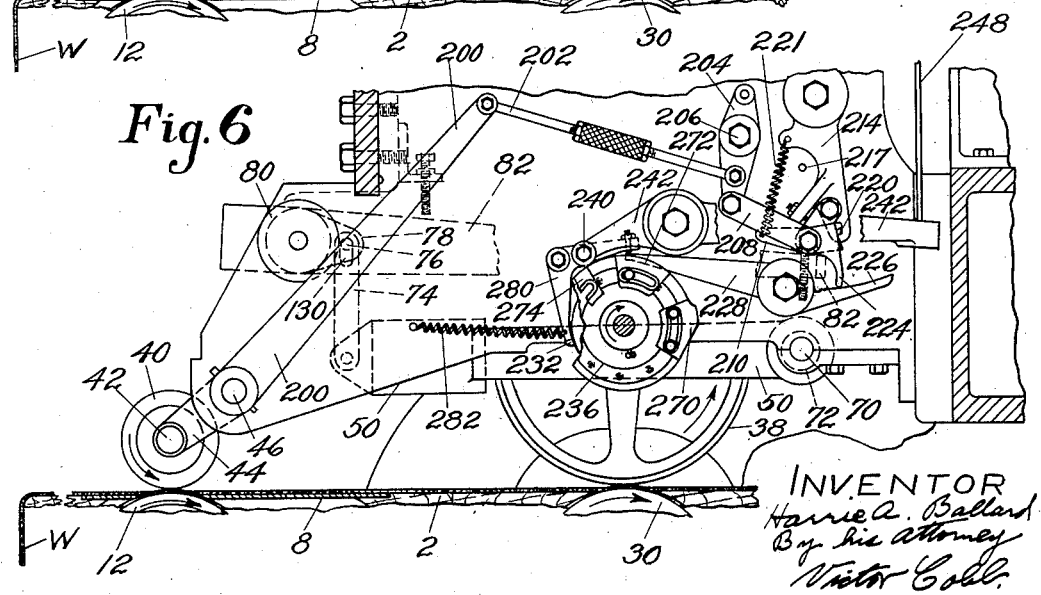

After the cam wheel 236 is clutched to the shaft 238 upon raising the clutch controlling lever 228 in the manner above described, the said cam wheel rotates in a clockwise direction (Figs. 2 to 8, inclusive), until the clutch dog 230, 232 gets around to the position shown in Fig. 6 where the end of a lever 280 engages with the projecting end of the clutch dog 232 and causes unclutching of the cam wheel 236 while the roll 240 of the lever 242 is still resting on the middle cam surface of the cam wheel 236. Conveniently, the lifting of the lever 228 to release the clutch dog 232 causes movement of the operative end of the lever 280 into position to engage the dog 232 to unclutch the cam wheel from the shaft 238. As long as the cam wheel 236 remains in the position shown in Fig. 6, the leather passing under the calipering means is measured and the measurement indicating operation is continued until the rear end of the piece of leather passes away from under the feeding-in roll 40, as shown in Fig. 7. Measurement of the work may continue after roll 40 has dropped off the rear end of the work as will be hereinafter explained. As soon as the roll drops off of the leather (Fig. 7), the link 208 and the levers 216 and 228 return to the positions shown in Fig. 2, whereupon the lever 280 is moved by a spring 282 (Figs. 2 to 8, inclusive) to disengage the end of the clutch dog 232. When this happens the cam wheel 236 is again clutched to the shaft 238 and is rotated until the clutch dog 232 is again engaged by the end of the clutch controlling lever 228 as shown in Fig. 2. During part or all of this last travel of the cam wheel 236 the roll 240 is on a low part of the cam wheel 236 and as a result all of the pawls 152, 156, 168 and 170 (Figs. 10 to 13, inclusive) are engaged to lock the indicator shafts 108 and 114 in final indicating position. It is to be understood that measurement of all or of a portion of the rear end of the piece of work, which extends between the feed-in roll 40 and the bite of the calipering wheels at the time the roll 40 drops off the rear end of the work, is determined by adjustment of cams 270, 272 and 274 on cam wheel 236. No measurement may be taken of certain parts of the work since, although the calipering wheels are responsive to variations in the thickness of the work, the indicators, as stated, may be locked against all movement. Furthermore, they remain locked until the entrance of a fresh piece of work under the feed-in roll 40 has caused clutching of the cam wheel 236 and travel of said cam wheel from the position shown in Fig. 2 to that shown in Fig. 5 at which time the cam roll 240 rides up on the high part or cam 270 of the cam wheel, thereby unlocking the indicator shafts 108 and 114 (Figs. 10 to 13, inclusive) so that they may become responsive to the movements of the calipering wheels. Since the high cam block 270 is adjustable on the cam wheel 236 it is clear that adjustment may be made of the distance through which the cam wheel 236 will rotate after being clutched to the shaft 238 before the cam block 270 causes release of the pointer shafts 108, 114. This distance traveled by the cam wheel 236 determines also the amount of hide, skin or leather that is fed in beyond the feed-in roll 40 before any actual measurement takes place. In other words, a predetermined amount of a given piece of work is fed into the machine before measurement starts, for during this time the pointer shafts 108, 114 are locked, having been left in that condition at the end of the measuring operation on the preceding piece of work. It is to be understood in this connection that the cam wheel 236 is driven at a speed which bears a predetermined relation to the speed of the feed-in rolls 12, 40 and the bed roll 30 with which the calipering wheels cooperate, the feed-in roll 12 and the bed roll 30 being positively driven at the same speed through the sprocket wheels 20, 24 and the chain 22. It is clear, therefore, that in the illustrated machine actual measuring operations may be restricted to a predetermined area located close to or at considerable distances from both the front and rear edges of the pieces of work.

It is sometimes desirable to shorten very materially the distance that a given piece of work travels after entering under the feed-in roll 40 before measurement begins. For instance, upon small skins, such as kid and sheep, the described distance may be reduced to a minimum, in the illustrated machine, since otherwise the length dimension of the area reserved for measurement would be too small for satisfactory results. In other words, while calf skins, which measure, in some cases, five or six feet from the head end to the butt end, may commonly have measurements start a foot and a half from the front end of the skin and cease at approximately the same distance from the rear end of the skin, it is clearly impractical to employ the same distances in measuring operations upon a small kid skin which may not be over two and one-half feet in its total length, from the head end to the butt end. For this reason the cams on the cam wheel 236 of the illustrated machine may be so arranged that the range of non-measurement at the entering end is from 0 to 14 inches and at the departing end of the skin the range is from 3½ to 14 inches, where the distance between the roll 40 and the calipering wheels is 14 inches.

By slowing up the rotation of the cam wheel 236 with respect to the driving shaft which operates the work feeding means, accomplished in the illustrated machine by varying the driving connections between the main driving shaft 26 and the shaft 238, provision may be made for a much wider range of unmeasured work at the entering end of the work and also an increase in range at the departing end of the work. Upon reference to Figs. 1 and 2 it will be observed that the shaft 26 is provided with a sprocket wheel 290 fixedly secured thereto and around which passes a chain 292. At its upper end the chain 292 is engaged with a sprocket 294 having a hub portion which is normally freely rotatable on an enlarged portion 296 of the shaft 238. As shown in Fig. 1, the sprocket wheel 294 is splined to the shaft part 296 by a key 298 shown pivoted at 300 to a collar 302 which is movable lengthwise of the shaft portion 296 but which is keyed to the shaft by the body portion of the key 298 which is located within the key groove 304 and which is movable in the groove lengthwise thereof upon shifting of the collar 302. If the collar 302 be shifted from the position shown in Fig. 1 to a position where it abuts against a stationary collar 306 the end portion of the key 298 will then engage in a slot 308 in the hub of a large sprocket wheel 310 in which case the large sprocket wheel 310 will serve as the driving means for the shaft 238, the sprocket wheel 310 being driven by a chain 312 which passes around a sprocket wheel 314 (Fig. 1) fixed to the shaft 26. Since the sprocket wheel 314 is of the same size as the sprocket wheel 299, it does not appear in Fig. 2 of the drawings. It will be readily understood that, when the collar 302 is moved to the left in Fig. 1, the shaft 238 is driven at a decreased speed by the large sprocket wheel 310 as compared with its rate of speed when the smaller sprocket wheel 294 serves as the driving connection with the power shaft 26. As before stated, slowing up of the shaft 238 and hence of the cam wheel 236 will result in widening the range of the unmeasured portions at the front and at the rear ends of the piece of work going through the machine. When the sprocket wheel 310 is in the driving means for cam wheel 236, the range of non-measurement at the entering end of the work is 0 to 26 inches and at the departing end of the work the range is from 0 to 14 inches, where the distance between the roll 40 and the calipering wheels is 14 inches.

In order to feed short skins more certainly and uniformly, the distance between the feed-in roll 40 and the calipering wheels may be shortened by removing from the machine a cotter pin 320 (Fig. 1) and also the shaft 42 and the feed-in roll 40 and then replacing these parts after the yoke 44 of the feed-in roll 40 has been repositioned in closer proximity to the calipering wheels, as shown in Fig. 9 of the drawings. When the feed-in roll 40 is moved to the position of Fig. 9, the lower feed-in roll 12 is moved with its shaft and sprocket wheel to the empty bearing shown at 322 (Fig. 2). Before these changes are made the metal table piece 8 is removed and then replaced in reversed relation so that the opening 10 (Figs. 2 and 9) is again positioned over the lower feed-in roll 12. In addition to the changes already made, the link 282 (Figs. 2 and 9) at the upper end of the lever arm 290 has its inner pivot transferred so as to connect with the upper end (Fig. 9) of the lever 284 instead of with the lower end, as shown in Fig. 2. By this rearrangement of the feed-in rolls 12, 40 the distance between the feed-in rolls 12, 40 and the bed roll 30 is materially reduced. (Compare Figs. 2 and 9). If the new distance between feed-in rolls 12, 40, and the bed roll 30 is 10 inches, for example, the range of unmeasured work at the entering end thereof will be from 0 to 30 inches and at the departing end from 0 to 10 inches, when the large sprocket wheel 314 (Fig. 1) is part of the driving means for cam wheel 236 (Fig. 2).

As already described, means is provided, in the illustrated machine, for indicating the average thickness dimension of the pieces of work subjected to measuring operations. The chain 112 (Figs. 1 and 2) is wound spirally around the spirally grooved shaft 120, through the combined operation of chains 102, 106 and their respective shafts 108 and 114, so that upon rotation of the shaft 120 the pointer 121 will be caused to move for indicating purposes over the face of the indicator dial 123. This average thickness, as determined in the illustrated machine, is not an averaging of the thickness dimensions of portions of the work which, at a given instant, are under the measuring wheels. The average thickness indicated by the pointer 121 is an average of the maximum thickness obtained by the pointer 140 on the pointer shaft 108 and of the minimum thickness obtained by the pointer 142 on the pointer shaft 114. In all probability, the maximum indication was obtained at a point quite different from the point of minimum thickness so that the two points have no relation to each other so far as the time of their determination through the calipering wheels of the measuring machine is concerned. It is considered, however, that the averaging of thickness dimensions obtained in the manner described is a very desirable and accurate measure, from the practical standpoint, of the thickness dimension of the piece of work, particularly where the area within which measurements are made is restricted to the best portions of the work in some such manner as that described herein. Obviously it would not be possible to obtain a fair average measurement of the thickness dimensions of the piece of work if the thinnest point of the flank were measured and averaged with the measurement of the thickest part of the head or of the butt end of the piece of work. Hence, the mechanism by which measurement of the thickness dimensions is restricted to a predetermined area of the best parts of hides, skins and pieces of leather constitutes a really important feature of the invention.

The illustrated machine is so constructed that different classes or kinds of work may be measured without the necessity of providing a number of different dials for pieces of work of various ranges of thicknesses. Furthermore, the construction is such that the pointer never makes more than one complete revolution in registering the greatest measurements for which the machine is designed. In order that the difficulties of the situation may be clearly understood it is pointed out that kid and goat skins vary in a range of from seven to forty-two thousandths of an inch, sheepskins from twenty to sixty thousandths of an inch, and that calf skins will commonly vary in thickness from thirty to ninety thousandths of an inch, while heavier skins, such as kip and light cattle hide, range in thickness from fifty to two hundred thousandths of an inch. On the other hand, kip skins which have been shaved vary in thickness measurements from twenty to fifty-five thousandths. In other words, the ranges of the thickness dimensions for the various classes of skins vary with respect to each other and overlap each other. While all of these skins might be measured by providing a dial with indicating marks from zero to two hundred it is clear that the divisions or indicating marks would be crowded so closely together as to render reading of the indicator more difficult and time-consuming. Such an arrangement, moreover, is not so accurate as that in which the movements of the indicator means are exaggerated with respect to the movements of the calipering means. In the latter case reasonable care and accuracy in the manufacture of machine parts is all that is necessary whereas, if the movements of the pointer were restricted to very fine gradations to indicate differences in thickness, the machine parts would have to be made with the utmost care and accuracy, thus contributing to the expensiveness of the machine. Accordingly, the illustrated machine is provided with means for setting the calipering mechanism with respect to the indicating means for various classes of work in which the ranges of thickness dimensions overlap each other. This adjustment of the calipering and indicating mechanisms is made without disturbing the connections of the indicating mechanism to the calipering elements of the machine. As stated in the foregoing description the yoke members 50, 56, 58 and 60 (Fig. 14) which support the calipering wheels 32, 34, 36 and 38 are each mounted at their rear ends upon a shaft 70 having an eccentric portion 72. Secured to the shaft 72 is a hand lever 330 (Fig. 15) having at its free end a pointer 332 adapted to move over a scale with indicating characters, as shown at 334. Secured to the hand lever 330 is a knurled or notched wheel 336 for operating a set screw 338 so that the hand lever 330 may be secured in adjusted position as determined by reference to the scale numbers on the indicator dial 334. If the machine is to be utilized in measuring shaved kips, for example, the hand lever 330 will be moved upwardly in Fig. 15 to an indicator number which represents a thickness somewhat less than 20 which is the minimum thickness of any of the shaved kips to be measured. Upon thus moving the hand lever 330, the calipering wheels 32, 34, 36, 38 will all be lifted upwardly away from the bed roll 30 through rotation of the eccentric portion 72 of the shaft 70. This spacing of the calipering wheels with respect to the bed roll must not be too great, otherwise the wheels will not press the piece of work onto the bed roll 30 with sufficient pressure to insure proper feeding of the work or proper movement of the wheels in response to the thickness of the work. Upward or downward movement of the wheels during the described adjustment does not affect in any way the indicator pointers 121, 140, 142 (Figs. 10 to 13, inclusive). Hence the pointer remains at zero on the dial during such adjustment. Since the pointer on the dial 123 (Fig. 1) remains at zero during adjustments of the calipering means effected by the lever 330 (Fig. 15), it is clear that an adjustment of the calipering means may be made preliminarily to measuring operations upon leathers of the greatest range of thicknesses. This is true for the reason that, through hand lever 330, a selected portion of the thickness, measured in fractions of an inch, is placed on the dial 334 (Fig. 15) by the pointer 332 which is part of the hand lever 330. Taking the thickest stock, for which a weighting machine will ordinarily be calipered, as having a range from one hundred twenty to two hundred fifty thousandths of an inch, the pointer 332 (Fig. 15) will be set at 100 while the pointer on dial 123 (Fig. 1) remains at zero. Hence the dial 123 will have to indicate only the measurement from twenty to one hundred-fifty thousandths of an inch on stock of a range of one hundred twenty to two hundred-fifty thousandths of an inch. If it is desired to know the actual measurement of the thickness dimensions of pieces of work in thousandths of an inch it is necessary only to add, to the indicated measurement, the number to which the hand lever 330 (Fig. 15) has been set. Ordinarily in assorting by hand pieces of leather of whatever class, tanners place the pieces in piles designated by terms well known in the industry such as "light", "light medium", "medium", "medium heavy", "heavy", "very heavy". Hence, it is proposed, to use, in connection with the indicator dial 123, markers 340 bearing characters L, LM, M, MH, etc. (Fig. 1) and adjustable upon the dial in accordance with the requirements of the individual manufacture. Where these arbitrary markers are used it will not be necessary to make any calculations if the hand lever 330 (Fig. 15) be used to adjust the machine to different grades of work. Each manufacturer may have the indicator mechanism so set as to meet his requirements, by passing through the machine various pieces of work of known thickness belonging to the various grades into which he wishes to divide his manufactured product. If his standard "light medium" kip skin be placed in the machine, the pointer 121 will move to a certain position on the indicator dial 123 and to the pointer in such position the marker LM will be adjusted. He will obtain the positions for his other markers in a similar manner.

In Fig. 2 of the drawings the levers 82, 86, 88 and 89 are all mounted at their forward ends upon the shaft 81. In Fig. 22 there is shown another mounting for these levers upon a knife edge 344 for the sake of greater accuracy and delicacy in the movement of the parts.

In operating the illustrated machine a piece of work is shoved over the table 2 until it is gripped between the feed-in rolls 12 and 40. Thereafter the work is fed by the rolls until it reaches the calipering wheels 32, 34, 36, 38 and the bed roll 30 which is power driven. As soon as the work enters beneath the feed roll 40, the timing mechanism comprising the cam wheel 236 is set in motion to unlock the indicating means which was locked toward the end of the measuring operation on the preceding piece of work. Subsequently the indicating means is rendered operative through the operation of the same cam member to indicate measurements of the work by the calipering wheels as the work passes along between said wheels and the bed roll. When the rear end of the work passes the roll 40 so that the latter drops therefrom the timing mechanism is rendered operative to control the indicating means in such a way as to prevent any further measurement of a predetermined portion at the rear or following end of the work. In other words, measurement of a piece of work is taken only in a predetermined portion at some definite distance from the front and rear ends. Hence, the operator is required to observe the indicating means only during measurement of the predetermined portion intermediate between the ends of the piece of work where the best quality of leather is found. The operator watches the indicating means to ascertain variations in the thickness dimensions within the predetermined measured area although in many cases this is not strictly necessary since, at the end of the measuring operation, all three pointers are locked in relation to their dials so that the measurements are maintained until a fresh piece of work is introduced into the machine. Ordinarily, the operator will classify the skin according to the indications furnished by the averaging pointer on the highest dial. If, however, there are very considerable variations from the average, as indicated by either the maximum or minimum thickness dimension, the operator may consider it advisable to classify the piece of work differently from the class indicated by the averaging pointer.

Having described my invention, what I claim as new and desire to secure by Letters Patent of the United States is:

1. In a machine for measuring operations upon hides, skins and pieces of leather, a support for a piece of work to be measured, means for calipering a dimension of a piece of work on the support, indicating means, connections between the calipering means and the indicating means for controlling the latter from the former, a single work-contacting member, and connections between said work-contacting member and the indicating means to cause the indicating means to perform indicating operations with respect to a predetermined intermediate portion only of the work.

2. In a measuring machine, a support for a piece of work to be measured, means for calipering a dimension of a piece of work on the support, indicating means, connections between the calipering means and the indicating means for controlling the latter from the former, a member arranged to contact with the work so as to be controlled thereby, and connections between the work-contacting member and the indicating means to determine the time of the response of the indicating means to the movements of the calipering means while the latter is contacting with the front end of the work and subsequently with the rear end of the same piece of work.

3. In a measuring machine, a support for a piece of work to be measured, means for calipering a dimension of a piece of work on the support, indicating means, connections between the calipering means and the indicating means for controlling the latter from the former, a member arranged to ride upon the entering end of the piece of work and to drop off the rear end thereof during passage of the work through the machine, and connections between the member and the indicating means whereby the time of operation of the indicating means in response to the movements of the calipering means is controlled by the member in its described movements at both ends of the piece of work.

4. In a measuring machine, a support for a piece of work to be measured, means for calipering a dimension of a piece of work on the support, indicating means, connections between the calipering means and the indicating means for controlling the latter from the former, and a member arranged to contact with the work so as to be controlled by both the entering and departing ends of the piece of work during its passage through the machine, and connections between the member and the indicating means to cause an operative or an inoperative condition of the indicating means and thus control the response of the indicating means to the movements of the calipering means at both ends of the piece of work undergoing measurement.

5. In a measuring machine, a support for a piece of work to be measured, means for calipering a dimension of a piece of work on the support, indicating means, connections between the calipering means and the indicating means for controlling the latter from the former, and a single member arranged to contact with the work so as to be controlled thereby, and connections between the work-controlled member and the indicating means to determine the distance from the front end of the piece of work at which the indicating means shall become responsive to the calipering means and also the distance from the rear end of the piece of work at which the indicating means shall cease to be responsive to the calipering means.

6. In a measuring machine, a support for a piece of work to be measured, means for co-operating with the work support in engaging opposite sides of the work to caliper thickness dimensions thereof during relative movement between the work and the work calipering means, means for indicating measurements made by the work calipering means, a work-contacting member adapted to be moved by the work, and a timing mechanism operatively connected to the work-contacting member to have its operations initiated thereby, said timing mechanism having connections with the indicating means and operative to determine the time of operation of the indicating means, whereby the indicating means operates only with respect to certain predetermined portions of the work.

7. In a machine for measuring dimensions of hides, skins, and pieces of leather, a support for a piece of work, means for calipering dimensions of the piece of work during relative movement between the work and the work calipering means, indicating means, connections between the indicating means and the calipering means effective to cause the former to be responsive to the latter, and means comprising a work controlled member for preventing indicating operations for a predetermined distance at the front or entering end of the work and also at the rear end thereof whereby indicating operations are restricted to an intermediate portion between the ends of the work.

8. In a machine for measuring thickness dimensions of hides, skins, and pieces of leather, a support for a piece of work, means for calipering thickness dimensions of the piece of work during relative movement between the work and the work calipering means, indicating means, connections between the indicating means and the calipering means effective to cause the former to be responsive to the latter, and means for rendering the indicating means unresponsive to the movements of the calipering means while the latter is in contact with predetermined portions at the front or entering end and at the rear end of the piece of work whereby indicating operations are restricted to an intermediate portion of the work.

9. In a machine for measuring thickness dimensions of hides, skins, and pieces of leather, a support for a piece of work, means for calipering thickness dimensions of the piece of work during relative movement between the work and the work calipering means, indicating means, connections between the indicating means and the calipering means effective to cause the former to be responsive to the latter, and means comprising a work controlled member for rendering the indicating means unresponsive to the movements of the calipering means while the latter is in contact with predetermined portions at the front or entering end and at the rear or following end of the piece of work whereby indicating operations are restricted to an intermediate portion of the work.

10. In a measuring machine, a support for a piece of work to be measured, means for calipering a dimension of a piece of work on the support, indicating means, connections between the calipering means and the indicating means for operating the latter from the former, means for locking the indicating means in indicating position and against movement by the calipering means, said locking means being also movable to inoperative position to release the indicating means to operation by the calipering means, and means having connections with the locking means to operate the latter and controlled by the work for determining what portions of the work at both the entering and the rear or following ends of the work shall remain unmeasured during the passage of the work through the machine.

11. In a measuring machine, a support for a piece of work to be measured, means for calipering a dimension of a piece of work on the support, means for causing relative movement between the work and the work calipering means, indicating means, connections between the calipering means and the indicating means for operating the latter from the former, means for locking the indicating means in indicating position, said locking means being also movable to inoperative position to release the indicating means to operation by the calipering means, and a member controlled by the work for determining the distance from the front or entering end of the work at which the indicating means is unlocked and also the distance from the rear end of the work at which the indicating means is again locked in indicating position.

12. In a machine for measuring thickness dimensions of hides, skins, and pieces of leather, a support for a piece of work, means for calipering thickness dimensions of the piece of work, means for causing relative movement between the work and the work calipering means, indicating means, connections between the indicating means and the calipering means effective to cause the former to be responsive to the latter, and a member controlled by the work for causing the indicating means to perform indicating operations with respect to a predetermined portion only of the work spaced from the entering end of the work and bearing a definite relation to the rear or following end of the same piece of work.

13. In a machine for measuring thickness dimensions of hides, skins, and pieces of leather, a support for a piece of work, means for calipering thickness dimensions of the piece of work, means for causing relative movement between the work and the work calipering means, indicating means, connections between the indicating means and the calipering means effective to cause the former to be responsive to the latter, said indicating means comprising a dial and a pointer, pawls to lock or unlock the pointer, a work contacting member, and means controlled by said work contacting member and comprising connections to said pawls for causing the indicating means to perform indicating operations with respect to a predetermined intermediate portion only of the work.

14. In a machine for measuring thickness dimensions of hides, skins, and pieces of leather, a support for a piece of work, means for calipering thickness dimensions of the piece of work, means for causing relative movement between the work and the work calipering means to pass the work by the work calipering means, indicating means, connections between the indicating means and the calipering means effective to cause the former to be responsive to the latter, means for rendering the indicating means inoperative while the calipering means is in contact with a predetermined portion at the front or entering end of the work whereby indicating operations are restricted to the portion of the work back of the predetermined unmeasured portion at the entering end of the work, and means comprising an adjustable cam for varying the extent of the unmeasured portion at the entering end of the work.

15. In a machine for measuring thickness dimensions of hides, skins, and pieces of leather, a support for a piece of work, means for calipering thickness dimensions of the piece of work, means for causing relative movement between the work and the work calipering means to pass the work by the work calipering means, indicating means having connections with the calipering means effective to cause the former to be responsive to the latter, a timing mechanism, connections between the timing mechanism and the indicating means to render said means responsive or unresponsive to the calipering means, and a work controlled member having connections with the timing mechanism, said work controlled member being arranged to ride upon the front or entering end of the work and to drop off of the rear or following end of the work to initiate and to terminate, respectively, the operation of the timing mechanism whereby the indicating means is unresponsive to a predetermined portion at the front or entering end of the work and to a predetermined portion at the rear or following end of the work.

16. In a machine for measuring thickness dimensions of hides, skins, and pieces of leather, a support for a piece of work, means for calipering thickness dimensions of the piece of work, means for causing relative movement between the work and the work calipering means to pass the work by the work calipering means, indicating means having connections with the calipering means effective to cause the former to be responsive to the latter, a timing mechanism, connections between the timing mechanism and the indicating means to render said means responsive or unresponsive to the calipering means, a work controlled member having connections with the timing mechanism, said work controlled member being arranged to ride upon the entering end of the work and to drop off of the rear or following end of the work to initiate and to terminate, respectively, the operation of the timing mechanism whereby the indicating means is unresponsive to a predetermined portion at the front or entering end of the work and to a predetermined portion at the rear or following end of the work, and means for varying the extent of the predetermined unmeasured portion at the front and at the rear or following end of the work.

17. In a machine for measuring thickness dimensions of hides, skins, and pieces of leather, a support for a piece of work, means for calipering thickness dimensions of the piece of work, indicating means having connections with the calipering means effective to cause the former to be responsive to the latter, a timing mechanism, connections between the timing mechanism and the indicating means to render said means responsive or unresponsive to the calipering means, a work controlled member having connections with the timing mechanism, said work controlled member being arranged to ride upon the entering end of the work and to drop off of the rear or following end of the work to initiate and to terminate respectively the operation of the timing mechanism whereby the indicating means is unresponsive to a predetermined portion at the front or entering end of the work and to a predetermined portion at the rear or following end of the work, and means for varying the extent of the predetermined, unmeasured portion at the front or entering end of the piece of work.

18. In a machine for measuring thickness dimensions of hides, skins, and pieces of leather, a support for a piece of work, means for calipering thickness dimensions of the piece of work, indicating means having connections with the calipering means effective to cause the former to be responsive to the latter, a timing mechanism, connections between the timing mechanism and the indicating means to render said means responsive or unresponsive to the calipering means, a work controlled member having connections with the timing mechanism, said work controlled member being arranged to ride upon the entering end of the work and to drop off of the rear or following end of the work to initiate and to terminate respectively the operation of the timing mechanism whereby the indicating means is unresponsive to a predetermined portion at the front or entering end of the work and to a predetermined portion at the rear or following end of the work, and means for varying the extent of the unmeasured portion at the rear or following end of the piece of work.

19. In a machine for measuring thickness dimensions of hides, skins, and pieces of leather, a support for a piece of work, means for calipering thickness dimensions of the piece of work, indicating means having connections with the calipering means effective to cause the former to be responsive to the latter, a timing mechanism, connections between the timing mechanism and the indicating means for rendering the indicating means responsive and unresponsive to the calipering means, said timing mechanism comprising a cam, power means for operating the cam, said cam being adjustable to vary the time of operation of the timing mechanism with respect to the indicating means, and a work controlled member arranged to ride upon the front or entering end of the work and to drop off of the rear or following end of the work and having connections for initiating operation of the power means and for terminating operation of the power means whereby the indicating means is rendered unresponsive to the calipering means while the latter is in contact with a predetermined portion at the front or entering end of the work and also to another predetermined portion at the rear or following end of the work.

20. In a measuring machine, a support for a piece of work to be measured, means for calipering a dimension of a piece of work on the support, indicating means, connections between the calipering means and the indicating means for operating the latter from the former, means for locking the indicating means in indicating position when the piece of work has arrived at a predetermined position with respect to the calipering means, means arranged to be controlled by the work for causing operation of the locking means, and a timing mechanism interposed between the locking means and the work controlled means for determining the time of operation of the locking means.

21. In a measuring machine, a support for a piece of work to be measured, means for calipering a dimension of a piece of work on the support, indicating means, connections between the calipering means and the indicating means for operating the latter from the former, means for locking the indicating means in indicating position when the piece of work has arrived at a predetermined position with respect to the calipering means, timing mechanism, connections between the timing mechanism and the locking means, and a work controlled member having connections with the timing mechanism to initiate operation of the latter so that the operation of the locking means is controlled by the piece of work undergoing measurement.

22. In a measuring machine, a support for a piece of work to be measured, means for calipering a dimension of a piece of work on the support, indicating means, connections between the calipering means and the indicating means for operating the latter from the former, means for locking the indicating means in indicating position when the piece of work has arrived at a predetermined position with respect to the calipering means, a timing mechanism comprising a cam having connections with said locking means, and a work controlled member for initiating operation of the cam so that the time of operations of the locking means is also controlled by the work.

23. In a measuring machine, a support for a piece of work to be measured, means for calipering a dimension of a piece of work on the support, indicating means, connections between the calipering means and the indicating means for operating the latter from the former, means for locking the indicating means in indicating position when the piece of work has arrived at a predetermined position with respect to the calipering means, a timing mechanism comprising a cam having connections with said locking means, and a work controlled member for initiating operation of the cam so that the time of operations of the locking means is also controlled by the work, said cam being adjustable to vary the time of operation of the locking means whereby the distance of the end of the work from the calipering means at the time of operation of the locking means may be predetermined by the operator.

24. In a measuring machine, a support for a piece of work to be measured, means for calipering a dimension of a piece of work on the support, indicating means, connections between the calipering means and the indicating means for operating the latter from the former, means for locking the indicating means in indicating position, said locking means being also movable to inoperative position to release the indicating means to the operation of the calipering means, a member arranged to be lifted by the entering end of the work and to drop off of the rear or departing end of the work, and a timing mechanism having connections with said locking means, said work contacting member having connections with the timing mechanism to initiate operation thereof when the work contacting member rides upon the entering end of the work and for terminating operation of the timing mechanism when the work passes from under the work contacting member.

25. In a measuring machine, a support for a piece of work to be measured, means for calipering a dimension of a piece of work on the support, indicating means, connections between the calipering means and the indicating means for operating the latter from the former, means for locking the indicating means in indicating position, said locking means being also movable to inoperative position to release the indicating means to operation by the calipering means, a timing mechanism for controlling the locking means, said mechanism comprising a cam having connections with the locking means to control the time of operation of locking and unlocking of the indicating means, and a work contacting member arranged to ride upon the entering end of the work and to drop off of the rear or departing end of the work, said work contacting member having connections for causing operation of the timing mechanism with relation to the two ends of the work whereby the distance from the entering end of the work at which the indicating means is unlocked and the distance from the rear or departing end of the work at which the indicating means is locked in indicating position is predetermined through co-operation of the work contacting member and the timing mechanism.

26. In a measuring machine, a support for a piece of work to be measured, work-contacting means for determining the measurement of a characteristic of a piece of work on the support, indicating means, connections between the work-contacting means and the indicating means for operating the latter from the former, a cam having connections with said indicating means to render the latter operative or inoperative, and a work-controlled member for initiating operation of the cam, whereby the time of operation of the indicating means is controlled both by the cam and by the work.

27. In a measuring machine, a support for a piece of work to be measured, means for calipering a dimension of a piece of work on the support, indicating means, connections between the calipering means and the indicating means for operating the latter from the former, a cam having connections with said indicating means to render the latter operative or inoperative, and a work controlled member for initiating and terminating operations of the cam so that the time of operation of the indicating means is also controlled by the work, said cam being adjustable to vary the time of operation of the indicating means whereby the distance of the end of the work from the calipering means at the time of operation of the indicating means may be predetermined by the operator.

28. In a measuring machine, a support for a piece of work to be measured, work-contacting means for determining the measurement of a characteristic of a piece of work on the support, indicating means, connections between the work-contacting means and the indicating means for operating the latter from the former, means for unlocking and locking the indicating means while the piece of work is still passing through the machine, a cam having connections with the unlocking and locking means to determine the time of operation of the indicating means, and a work contacting member for controlling the cam to determine the time of the indicating operations with respect to predetermined portions of the work.

29. In a measuring machine, a support for a piece of work to be measured, means for co-operating with the work support in engaging opposite sides of the work to caliper thickness dimensions thereof during relative movement between the work and the work calipering means, indicating means, connections between the indicating means and the work calipering means effective to cause the former to be responsive to the latter, timing mechanism, and a member adapted to contact with the work and arranged to operate through the timing mechanism for controlling the indicating means.

30. In a measuring machine, a support for a piece of work to be measured, means for co-operating with the work support in engaging opposite sides of the work to caliper thickness dimensions thereof, means for causing relative movement between the work and the work calipering means, indicating means, connections between the indicating means and the work calipering means effective to cause the former to be responsive to the latter, timing mechanism operatively connected to the indicating means, power means for operating the timing mechanism in timed relation to the relative movement of the work and of the work calipering means, and a member arranged to contact with the work as the latter moves over the work support and having connections through the timing mechanism with the indicating means for controlling the operations of the latter.

31. In a measuring machine, a support for a piece of work to be measured, means for co-operating with the work support in engaging opposite sides of the work to caliper thickness dimensions thereof during relative movement between the work and the work calipering means, indicating means, connections between the indicating means and the work calipering means effective to cause the former to be responsive to the latter, timing mechanism comprising a cam, means for operatively connecting the cam to the indicating means, and a member controlled by the work and arranged to cause operation of the cam for controlling the indicating means.

32. In a measuring machine, a support for a piece of work to be measured, means for co-operating with the work support in engaging opposite sides of the work to caliper thickness dimensions thereof, means for causing relative movement between the work and the work calipering means, indicating means, connections between the indicating means and the work calipering means effective to cause the former to be responsive to the latter, timing mechanism operatively connected to the indicating means, power means for operating the timing mechanism in timed relation to the relative movement of the work and of the work measuring means, said power means comprising a clutch, and a member arranged to contact with the work as the latter moves over the work support and having connections with the clutch for controlling the clutch and, through the latter, the operations of the indicating means.

33. In a measuring machine, a support for a piece of work to be measured, means for co-operating with the work support in engaging opposite sides of the work to caliper thickness dimensions thereof, means for causing relative movement between the work and the work calipering means, indicating means, connections between the indicating means and the work calipering means effective to cause the former to be responsive to the latter, timing mechanism comprising a cam member arranged to be driven in timed relation to the relative movement of the work and the work calipering means, means comprising said timing mechanism and its cam member for controlling the indicating means, and a work contacting member having connections for controlling said cam member to effect operation of the indicating means at such times in the relative movement of the work and the work measuring means as may be determined by said timing mechanism and its cam member.

34. In a measuring machine, a support for a piece of work to be measured, means for co-operating with the work support in engaging opposite sides of the work to caliper thickness dimensions thereof, means for causing relative movement between the work and the work calipering means, indicating means, connections between the indicating means and the work calipering means effective to cause the former to be responsive to the latter, a timing mechanism comprising a rotary cam member arranged to be driven in timed relation to the relative movement of the work and the work calipering means, a lever controlled by said cam, means for locking and unlocking the indicating means having connections to said lever, and a member arranged to contact with the work so as to be controlled thereby and having connections arranged to initiate operation of the rotary cam member so that the indicating means may be locked or unlocked in timed relation to the movements of the work contacting member.

35. In a measuring machine, a support for a piece of work to be measured, means for cooperating with the work support in engaging opposite sides of the work to caliper thickness dimensions thereof, means for causing relative movement between the work and the work calipering means, indicating means, connections between the indicating means and the work calipering means effective to cause the former to be responsive to the latter, timing mechanism comprising a cam member arranged to be driven in timed relation to the relative movement of the work and the work calipering means, means comprising said timing mechanism and its cam member for rendering the indicating means operative or inoperative, and a work contacting member having connections for effecting operation of said timing mechanism and its cam member and thus initiating operation of the indicating means.

36. In a measuring machine, a support for a piece of work to be measured, means for cooperating with the work support in engaging opposite sides of the work to caliper thickness dimensions thereof, means for causing relative movement between the work and the work calipering means, indicating means, connections between the indicating means and the work calipering means effective to cause the former to be responsive to the latter, a timing mechanism comprising a cam member arranged to be driven in timed relation to the relative movement of the work and the work calipering means, a lever controlled by said cam, means for rendering the indicating means either operative or inoperative and having connections to said lever, and a member arranged to contact with the work so as to be controlled thereby and having connections arranged to initiate operation of the cam member so that the indicating means may be either operative or inoperative in timed relation to the movements of the work and of the work contacting member.

37. In a measuring machine, a support for a piece of work to be measured, means for cooperating with the work support in engaging opposite sides of the work to caliper thickness dimensions thereof, means for causing relative movement between the work and the work calipering means, indicating means, connections between the indicating means and the work calipering means effective to cause the former to be responsive to the latter, a timing mechanism, connections between the timing mechanism and the indicating means, power means arranged to be driven in timed relation to the relative movement of the work and the work calipering means, and a work contacting member arranged to be lifted from the work support by the entering end of the work and subsequently to drop off of the rear end of the work, said work contacting member having connections for causing connection of the timing mechanism to said power means upon lifting of said member by the work and disconnection of the timing mechanism from the power means upon dropping of said member from the work, thereby to control the operation of the indicating means in timed relation to the work.

38. In a measuring machine, a work support, means for calipering pieces of work passing over the support, means for feeding the work over the support and past the work calipering means, indicating means, connections between the indicating means and the work calipering means effective to cause the former to be responsive to the latter, timing mechanism arranged to be driven in timed relation to the work feeding means, said timing mechanism comprising a cam, connections between the cam and the indicating means, and a member arranged to be lifted by the forward end of the work as it passes over the work support and to drop off the rear end of the work, said work contacting member having connections for controlling the operation of the timing mechanism through said cam.

39. In a measuring machine, a work support, means for calipering pieces of work passing over the support, means for feeding the work over the support and past the work calipering means, indicating means, connections between the indicating means and the work calipering means effective to cause the former to be responsive to the latter, power means arranged to be driven in timed relation to the work feeding means, a cam member, connections to the indicating means arranged to be operated by the cam member, a clutch for connecting and disconnecting the cam member with respect to the power means, and a work contacting member arranged to be lifted by the forward end of the work and to drop off of the rear end of the work, said work contacting member having connections to control said clutch whereby the measurement indicating means is controlled by said work contacting member.

40. In a measuring machine, a work support, means for calipering pieces of work passing over the support, means for feeding the work over the support and past the work calipering means, indicating means, connections between the indicating means and the work calipering means effective to cause the former to be responsive to the latter, a timing mechanism, power means arranged to be driven in timed relation to the work feeding means, means for clutching the timing mechanism to said power means, means for locking and unlocking the indicating means, connections between the locking and unlocking means and the timing mechanism whereby the latter may operate the former, and a work contacting member arranged to be lifted by the forward end of the work and to drop off of the rear end of the work, said work contacting member having connections for controlling said clutching means.

41. In a measuring machine, a work support, means for calipering pieces of work passing over the support, means for feeding the work over the support and past the work calipering means, indicating means, connections between the indicating means and the work calipering means effective to cause the former to be responsive to the latter, power means independent of the work calipering means for controlling the indicating means, and a work contacting member arranged to be lifted by the forward end of the work and to drop off of the rear end of the work, said work contacting member having connections for controlling said power means, whereby the indicating means is controlled with reference to the entering end and the rear end, respectively, of the work.

42. In a measuring machine, a work support, means for calipering thickness dimensions of a piece of work during relative movement of the work and the work calipering means, means for indicating measurement of the work, connections between the calipering and indicating means, said indicating means comprising a dial and a pointer movable over the dial, means for locking the pointer against movement in one direction, means for locking the pointer against movement in the other direction, a member for controlling both locking means, a work contacting member arranged to be lifted by the forward end of the work and to drop from the rear end of the work, and connections between the work contacting member and lock controlling member for determining the time of operation of both locking means.

43. In a measuring machine, a work support, means for calipering thickness dimensions of a piece of work during relative movement of the work and the work calipering means, means for indicating measurement of the work, connections between the calipering and indicating means, said indicating means comprising a dial and a pointer movable over the dial, means for locking the pointer against movement in one direction, means for locking the pointer against movement in the other direction, a member for controlling both locking means, a timing member, power means for driving the timing member, connections between the timing member and the lock controlling member for operating the latter, and a work contacting member arranged to be lifted by the forward end of the work and to drop from the rear end of the work, said work contacting member having connections for connecting and disconnecting the timing member with respect to the power means.

44. In a measuring machine, a work support, means for calipering dimensions of a piece of work on the work support during relative movement of the work and the work calipering means, indicating means, connections between the indicating means and the work calipering means for causing operation of the indicating means, said indicating means comprising a dial and a pointer movable over the dial, members connected to the pointer and having sets of ratchet teeth pointing in opposite directions, a pair of pawls, each pawl arranged to engage with one set of ratchet teeth, the arrangement being such that engagement of one pawl with its associated set of ratchet teeth prevents movement of the pointer in one direction only while engagement of both pawls with their respective sets of ratchet teeth causes locking of the pointer against movement in both directions, means for controlling both pawls, a single work contacting member, and means controlled by the work contacting member for operating the pawl controlling means in timed relation to the described movement of the work.

45. In a measuring machine, a work support, means for calipering dimensions of a piece of work during relative movement of the work and the work calipering means, indicating means, connections between the indicating means and the work calipering means for causing operation of the indicating means, said indicating means comprising a dial and a pointer movable over the dial, members connected to the pointer and having sets of ratchet teeth pointing in opposite directions, a pair of pawls, each pawl arranged to engage with one set of ratchet teeth, the arrangement being such that engagement of one pawl with its associated set of ratchet teeth prevents movement of the pointer in one direction only while engagement of both pawls with their respective sets of ratchet teeth causes locking of the pointer against movement in both directions, a single member for controlling both pawls, a work contacting member, and means controlled by the work contacting member for operating the pawl controlling member in timed relation to the movement of the work over the work support.

46. In a measuring machine, a work support, means for calipering dimensions of a piece of work during relative movement of the work and the work calipering means, indicating means, connections between the indicating means and the work calipering means for causing operation of the indicating means, said indicating means comprising a dial and a pointer movable over the dial, members connected to the pointer and having sets of ratchet teeth pointing in opposite directions, a pair of pawls, each pawl arranged to engage with one set of ratchet teeth, the arrangement being such that engagement of one pawl with its associated set of ratchet teeth prevents movement of the pointer in one direction only while engagement of both pawls with their respective sets of ratchet teeth causes locking of the pointer against movement in both directions, a single member for controlling both pawls, a timing mechanism, connections between the timing mechanism and the pawl controlling member, and a work contacting member arranged to be lifted by the entering end of the work and to drop off of the rear end of the work, said work contacting member having connections for controlling the operation of the timing mechanism, whereby the pawls are controlled in timed relation to the entering end and the rear end, respectively, of the work.

47. In a measuring machine, a work support, means for calipering dimensions of a piece of work during relative movement of the work and the work calipering means, indicating means, connections between the indicating means and the work calipering means for causing operation of the indicating means, said indicating means comprising a dial and a pointer movable over the dial, members connected to the pointer and having sets of ratchet teeth pointing in opposite directions, a pair of pawls, each pawl arranged to engage with one set of ratchet teeth, the arrangement being such that engagement of one pawl with its associated set of ratchet teeth prevents movement of the pointer in one direction only while engagement of both pawls with their respective sets of ratchet teeth causes locking of the pointer against movement in both directions, a single member for controlling both pawls, power means for causing relative movement of the work and the work calipering means, a timing mechanism, power means arranged to be driven in timed relation to the first-mentioned power means for driving the timing mechanism, connections between the timing mechanism and the pawl controlling member, and a work contacting member arranged to be lifted by the entering end of the work and to drop off of the rear end of the work, said work contacting member having connections for controlling the operation of the last-mentioned power means, whereby the pawls are controlled in timed relation to the entering end and the rear end, respectively, of the work.

48. In a machine for measuring dimensions of pieces of work, a work support, means for calipering thickness dimensions of pieces of work on the work support, indicating means, connections between the work calipering means and the indicating means for operating the indicating means, said indicating means comprising two indicators, each having a movable indicator member, said connections being arranged to cause movement of each indicator member in opposite directions as thinner and thicker parts of the work are engaged by the calipering means, and means for preventing movement of one of the indicator members in one direction and movement of the other indicator member in the opposite direction, whereby one indicator member indicates progressively thicker dimensions of the work while the other indicator member indicates progressively thinner dimensions of the work.

49. In a machine for measuring dimensions of pieces of work, a work support, means for calipering thickness dimensions of pieces of work on the work support, indicating means, connections between the work calipering means and the indicating means for operating the indicating means, said indicating means comprising two indicators, each having a movable indicator member, said connections being arranged to cause movement of each indicator member in opposite directions as thinner and thicker parts of the work are engaged by the calipering means, and means for preventing movement of one of the indicator members in one direction and movement of the other indicator member in the opposite direction, whereby one indicator member indicates progressively thicker dimensions of the work while the other indicator member indicates progressively thinner dimensions of the work, and a member operated by the work for controlling the operation of the means for preventing movement of the indicator members.

50. In a machine for measuring thickness dimensions of pieces of work, a work support, means for calipering thickness dimensions of a piece of work on the work support, indicating means, connections between the work calipering means and the indicating means for operating the latter, said indicating means comprising two indicators having each a movable indicator member, means for locking the indicator members against movement each in one direction only, the arrangement being such that when the locking means is operative one indicator member may move in one direction to indicate progressively decreasing thickness dimensions while the other indicator member may move to indicate only progressively increasing thickness dimensions of the work, and a member controlled by the work for rendering the locking means inoperative so that the indicator members may be freed for indicating operations with respect to another piece of work.

51. In a machine for measuring thickness dimensions of pieces of work, a work support, means for calipering thickness dimensions of a piece of work on the work support, indicating means, connections between the work calipering means and the indicating means for operating the latter, said indicating means comprising two dials each having a pointer movable over its respective dial, two members having sets of ratchet teeth facing in opposite directions and connected to one of the pointers, the other pointer having similar ratchet members connected thereto, a pair of pawls for engagement with the sets of ratchet teeth associated with one pointer, the other pointer having another pair of pawls similarly arranged with respect to the sets of ratchet teeth, a work contacting member, and means controlled by the work contacting member for operating both pairs of pawls so that the pawls may be engaged with their respective sets of ratchet teeth to lock both pointers against movement in one direction only or against movement in both directions in accordance with the position of the work with respect to the work contacting member.

52. In a machine for measuring dimensions of pieces of work, a work support, means for calipering thickness dimensions of pieces of work on the work support, indicating means, connections between the work calipering means and the indicating means for operating the indicating means, said indicating means comprising two indicators, each having a movable indicator member, said connections being arranged to cause movement of each indicator member in opposite directions as thinner and thicker parts of the work are engaged by the measuring means, means for preventing movement of one of the indicator members in one direction and movement of the other indicator member in the opposite direction, whereby one indicator member indicates progressively thicker dimensions of the work while the other indicator member indicates progressively thinner dimensions of the work, a timing mechanism having connections with the means for preventing movement of the indicator members, and a work contacting member for initiating operation of the timing mechanism.

53. In a machine for measuring thickness dimensions of pieces of work, a work support, means for calipering thickness dimensions of a piece of work on the work support, indicating means, connections between the work calipering means and the indicating means for operating the latter, said indicating means comprising two indicators having each a movable indicator member, said connections being arranged to cause movement of each indicator member in opposite directions as thinner and thicker parts of the work are engaged by the measuring means, means for locking the indicator members against movement each in one direction only, the arrangement being such that when the locking means is operative one indicator member may move in one direction to indicate progressively decreasing thickness dimensions while the other indicator member may move to indicate only progressively increasing thickness dimensions of the work, a timing mechanism having connections with the locking means, power means comprising a clutch for operating the timing means, and a work contacting member for controlling the clutch so that the locking means will be either operative or inoperative in accordance with the position of the work.

54. In a machine for measuring thickness dimensions of pieces of work, a work support, means for calipering thickness dimensions of a piece of work on the work support, indicating means, connections between the work calipering means and the indicating means for operating the latter, said indicating means comprising two dials each having a pointer movable over its respective dial, two members having sets of ratchet teeth facing in opposite directions and connected to one of the pointers, the other pointer having similar ratchet members connected thereto, a pair of pawls for engagement with the sets of ratchet teeth associated with one pointer, the other pointer having another pair of pawls similarly arranged with respect to the sets of ratchet teeth, a work contacting member, and a timing mechanism controlled by the work contacting member for operating both pairs of pawls so that the pawls may be engaged with their respective sets of ratchet teeth to lock both pointers against movement in one direction only or against movement in both directions in accordance with the position of the work with respect to the work contacting member.

55. In a measuring machine, a work support, means for calipering pieces of work passing over the support, means for moving the work and the work calipering means relatively to each other to pass the work past the work calipering means, indicating means, connections between the indicating and the calipering means effective to cause the former to be responsive to the latter, a timing mechanism, connections between said timing mechanism and the indicating means to control the time of response of the latter to the calipering means, means under the control of the operator for causing the timing mechanism to be driven at different speeds, and a work contacting member arranged to be lifted by the forward end of the work and to drop off of the rear end of the work, said work contacting member having connections for controlling said timing mechanism whereby the indicating means is controlled with reference to the entering end and the rear end, respectively, of the work as well as by said timing mechanism.

56. In a measuring machine, a work support, means for calipering thickness dimensions of a piece of work passing over the support, means for moving the work and the work calipering means relatively to each other to pass the work past the work calipering means, indicating means, connections between the indicating and the calipering means effective to cause the former to be responsive to the latter, a timing mechanism, power means for driving said timing mechanism, connections between said timing mechanism and the indicating means to control the time of response of the latter to the calipering means, means under the control of the operator for causing the power-means to be driven at different speeds, and a work contacting member arranged to be lifted by the forward end of the work and to drop off of the rear end of the work, said work contacting member having connections for controlling said power means whereby the indicating means is controlled with reference to the entering end and the rear end, respectively, of the work as well as by said timing mechanism.

57. In a measuring machine, a work support, means for calipering pieces of work passing over the support, means for moving the work and the work calipering means relatively to each other to pass the work past the work calipering means, indicating means, connections between the indicating and the calipering means effective to cause the former to be responsive to the latter, a timing mechanism, power means for driving said timing mechanism, means for clutching the timing mechanism to said power means, connections between said timing mechanism and the indicating means to control the time of response of the latter to the calipering means, means under the control of the operator for causing the timing mechanism to be driven at different speeds, and a work contacting member arranged to be lifted by the forward end of the work and to drop off of the rear end of the work, said work contacting member having connections for controlling said timing mechanism through said clutching means, whereby the indicating means is controlled with reference to the entering end and the rear end, respectively, of the work as well as by said timing mechanism.

58. In a machine for measuring thickness dimensions of hides, skins, and pieces of leather, a support for a piece of work, means for calipering thickness dimensions of the piece of work, minimum and maximum thickness indicating means having connections with the calipering means effective to cause the former to be responsive to the latter, means comprising said connections for operating the indicating means to indicate the minimum and also the maximum thickness dimension of the piece of work, a single work contacting member, and connections between the last-mentioned member and said indicating means arranged to control the time of operation of both the minimum and maximum indicating means with respect to the front and rear ends of the work.

59. In a machine for measuring thickness dimensions of hides, skins, and pieces of leather, a support for a piece of work, means for calipering thickness dimensions of the piece of work, indicating means having connections with the calipering means effective to cause the former to be responsive to the latter, said indicating means comprising two dials with their respective pointers, means comprising said connections for operating one pointer to indicate progressively thinner dimensions of the piece of work until the minimum thickness dimension is reached and for operating the other pointer to indicate progressively thicker dimensions until the maximum thickness dimension is indicated, a single work-contacting member, and connections between the last-mentioned member and said pointers arranged to determine the time of operation of both pointers with respect to the work.

60. In a measuring machine, a support for a piece of work to be measured, means for calipering thickness dimensions of a piece of work on the support, indicating means, connections between the calipering means and the indicating means for operating the latter from the former, and means for locking the indicating means against movement in one direction only to effect indication of progressively increasing thickness dimensions until the maximum thickness dimension is reached, and a single work-contacting member having connections for initiating and terminating operation of the indicating means with respect to the front and rear ends of the work.

61. In a measuring machine, a support for a piece of work to be measured, means for calipering thickness dimensions of a piece of work on the support, indicating means, connections between the calipering means and the indicating means for operating the latter from the former, means for locking the indicating means against movement in one direction only to effect indication of progressively increasing dimensions until the maximum thickness dimension is reached, means comprising the last-mentioned means for locking the indicating means against all movement, and a member arranged to be lifted by the entering end of the work and to drop off of the rear or following end of the work and having connections with both said locking means to control the latter in timed relation to the movement of the work relative to the work calipering means, whereby measurement for the maximum thickness dimension may be restricted to predetermined portions of the work.

62. In a measuring machine, a support for a piece of work to be measured, means for calipering thickness dimensions of a piece of work on the support, indicating means, connections between the calipering means and the indicating means for operating the latter from the former, means for locking the indicating means against movement in one direction only to effect indication of progressively decreasing thickness dimensions until the minimum thickness dimension is reached, means for locking the indicating means against movement in the opposite direction while the first-mentioned locking means is operative, and a work contacting member arranged to ride upon the entering end of the work and to drop off of the rear or departing end of the work, said work contacting member having connections for causing operation of both locking means with relation to the two ends of the work, whereby measurement for the minimum thickness dimension may be restricted to predetermined portions of the work.

63. In a measuring machine, a support for a piece of work to be measured, means for calipering thickness dimensions of a piece of work on the support, indicating means, connections between the calipering means and the indicating means for operating the latter from the former, means for locking the indicating means against movement in one direction only to effect indication of progressively decreasing thickness dimensions until the minimum thickness dimension is reached, a cam having connections with the locking means to control the time of operation of locking and unlocking of the indicating means, and a work contacting member arranged to ride upon the entering end of the work and to drop off of the rear or departing end of the work, said work contacting member having connections for causing operation of said cam thus controlling the indicating means with relation to the two ends of the work, whereby measurement for the minimum thickness dimension may be restricted to predetermined portions of the work.

64. In a machine for measuring thickness dimensions of hides, skins, and pieces of leather, a support for a piece of work, means for calipering thickness dimensions of the piece of work, indicating means having connections with the calipering means effective to cause the former to be responsive to the latter, said indicating means comprising two dials with their respective pointers, and means comprising said connections for operating one pointer in one direction only to indicate progressively thicker dimensions until the maximum thickness dimension is reached and for operating the other pointer in the opposite direction on its dial to indicate progressively thinner dimensions until the minimum thickness dimension is reached.

65. In a machine for measuring thickness dimensions of hides, skins, and pieces of leather, a support for a piece of work, means for calipering thickness dimensions of the piece of work, indicating means having connections with the calipering means effective to cause the former to be responsive to the latter, said indicating means comprising three dials each with its indicating pointer, means comprising said connections for operating the pointers of two of the dials each in one direction only to indicate respectively the minimum thickness dimension and the maximum thickness dimension of the piece of work being measured, and connections between the minimum and maximum thickness indicating pointers and the pointer of the third dial comprising an averaging member whereby the third pointer and dial indicate an average of the minimum thickness dimension and the maximum thickness dimension ascertained by the minimum and the maximum thickness indicating pointers.

66. In a machine for measuring thickness dimensions of hides, skins, and pieces of leather, a support for a piece of work, means for calipering thickness dimensions of the piece of work, two indicating means, connections between the indicating means and the calipering means effective to cause the former to be responsive to the latter, one indicating means being responsive to upward movement only of the calipering means and the other indicating means to downward movement only of the calipering means, and means comprising said connections for operating the indicating means, whereby the first-mentioned indicating means indicates progressively thicker dimensions of the work until the maximum thickness dimension of the piece of work is reached, while the other indicating means indicates progressively thinner dimensions of the work until the minimum thickness dimension is reached, a single work-controlled member, and connections between the last-mentioned member and said two indicating means arranged to determine the time of operation of the two indicating means with respect to the work.

67. In a machine for measuring thickness dimensions of hides, skins, and pieces of leather, a support for a piece of work, means for calipering thickness dimensions of the piece of work, indicating means having connections with the calipering means effective to cause the former to be responsive to the latter, said indicating means comprising two dials with their respective pointers, and means for locking one pointer against movement in one direction so that it may rotate to indicate progressively thicker dimensions until the maximum thickness dimension is reached and for locking the other pointer against movement in the opposite direction so that it may rotate over its dial to indicate progressively thinner dimensions until the minimum thickness dimension is reached, a single work-controlled member and connections between the last-mentioned member and said locking means arranged to operate the locking means in relation to both ends of the piece of work.

68. In a machine for measuring thickness dimensions of hides, skins, and pieces of leather, a support for a piece of work, means for calipering thickness dimensions of the piece of work, indicating means having connections with the calipering means effective to cause the former to be responsive to the latter, said indicating means comprising three dials each with its indicating pointer, means for locking the pointers of two of the dials each against movement in one direction only so that each pointer may move in one direction only in response to the calipering means to indicate, respectively, the minimum thickness dimension and the maximum thickness dimension of the piece of work being measured, means controlled by the work for locking the minimum and maximum indicating pointers at a certain point in relation to the work, and connections between the minimum and maximum indicating pointers and the pointer of the third dial comprising an averaging member whereby the third pointer and dial indicate an average of the minimum thickness dimension and the maximum thickness dimension ascertained by the minimum and the maximum thickness indicating pointers, the third pointer being locked through said connections by said locking means.

69. In a measuring machine, a support for a piece of work to be measured, means for calipering the maximum and minimum thickness dimensions of a piece of work on the support, indicating means, connections between the calipering means and the indicating means for controlling the latter from the former, and means for causing the indicating means to be responsive to the calipering means to indicate the maximum and minimum thickness dimensions of the piece of work within a predetermined portion only of the piece of work, said last-mentioned means comprising a member arranged to be lifted by the front end of the work and to drop off the rear end thereof to determine the boundaries of said predetermined portion with respect to both the front end and the rear end of the piece of work being measured.

70. In a measuring machine, a support for a piece of work to be measured, means for calipering the maximum and minimum thickness dimensions of a piece of work on the support, indicating means, connections between the calipering means and the indicating means for controlling the latter from the former, a single work-contacting member, and timing connections between said single work-contacting member and the indicating means arranged to prevent operation of the indicating means for predetermined distances at the front end and at the rear end of the piece of work as the latter is passed through the machine to be measured.

71. In a measuring machine, a work support, means for calipering the maximum and minimum thickness dimensions of a piece of work during relative movement of the work and the work calipering means, means for indicating the maximum and minimum thickness measurement of the work, connections between the indicating means and the calipering means effective to cause the former to be responsive to the latter, means comprising pawls for locking and unlocking the indicating means, and a work contacting member arranged to be lifted by the forward end of the work and to drop off of the rear end of the work, said work contacting member having connections for controlling both indicating means through said pawls, whereby indication of the maximum and minimum thickness dimensions may be limited to predetermined portions of the work.

72. In a measuring machine, a work support, means for calipering the maximum and minimum thickness dimensions of a piece of work passing over the support, means for moving the work and the work calipering means relatively to each other to pass the work past the calipering means, means for indicating the maximum and minimum thickness measurement of the work, connections between the indicating means and the calipering means effective to cause the former to be responsive to the latter, timing mechanism arranged to be driven in timed relation to the relative movement of the work and the work calipering means, said timing mechanism comprising a cam, connections between the cam and the indicating means whereby the time of operation of the latter is controlled, and a member arranged to be lifted by the forward end of the work and to drop off the rear end of the work, said work contacting member having connections for controlling the operation of the timing mechanism, whereby indication of the maximum and minimum thickness dimensions may be limited to predetermined portions of the work.

73. In a measuring machine, a support for a piece of work to be measured, means comprising a movable member for calipering a dimension of a piece of work on the support, indicating means, and connections between the calipering means and the indicating means to cause movement of the indicating means by the calipering means when said movable member of the latter moves in one direction, said connections comprising a lever for supporting the movable calipering member and a connecting member pivoted to one end of said lever, and said lever being adjustable at its fulcrum for raising or lowering the calipering member with respect to the work support to accommodate pieces of work of different thicknesses, adjustment of the lever at its fulcrum having the effect merely of moving the lever about its point of pivotal connection with said connecting member without disturbing the indicating means and its connections to the calipering means.

74. In a measuring machine, a work support, means comprising a movable member for calipering dimensions of a piece of work on the support, indicating means, connections between the calipering means and the indicating means to cause movement of the indicating means by the calipering means when said movable calipering member moves in one direction, said connections comprising a lever of the third class for supporting the movable calipering member and a connecting member pivoted to the lever at the end opposite to its fulcrum end, and means for raising or lowering the fulcrum of the lever to vary the distance of the calipering member from the work supporting surface and thus adjust the calipering member to different classes of work, adjustment of the lever at its fulcrum having the effect merely of moving the lever about its point of pivotal connection with said connecting member without disturbing the indicating means and its connections to the calipering means.

75. In a measuring machine, a work support, means comprising a movable member for calipering dimensions of a piece of work on the support, indicating means, connections between the calipering means and the indicating means to cause movement of the indicating means by the calipering means when said movable calipering member moves in one direction, means for causing movement of the indicating means when said movable member moves in another direction, said connections comprising a lever for supporting between its ends the movable calipering member, said connections comprising also a lost-motion connection between the indicating means and the free end of the lever, and means for raising or lowering the fulcrum end of the lever to vary the distance of the movable calipering member from the work support and thus adjust the calipering means to different classes of work.

HARRIE ALBERT BALLARD.